(12) United States Patent
Tausch

(10) Patent No.: US 8,783,733 B2
(45) Date of Patent: Jul. 22, 2014

(54) FLUID HANDLING SWIVEL JOINTS AND FLUID CONVEYANCE EQUIPMENT INCORPORATING THE SAME

(75) Inventor: Mark J. Tausch, West Chester, OH (US)

(73) Assignee: Delaware Capital Formation, Inc., Wilmington, DE (US)

(*) Notice: Subject to any disclaimer, the term of this patent is extended or adjusted under 35 U.S.C. 154(b) by 157 days.

(21) Appl. No.: 13/356,702

(22) Filed: Jan. 24, 2012

(65) Prior Publication Data

US 2012/0187675 A1 Jul. 26, 2012

Related U.S. Application Data

(60) Provisional application No. 61/435,530, filed on Jan. 24, 2011, provisional application No. 61/435,537, filed on Jan. 24, 2011, provisional application No. 61/495,524, filed on Jun. 10, 2011.

(51) Int. Cl.
*F16L 27/00* (2006.01)

(52) U.S. Cl.
USPC ............................................. 285/276

(58) Field of Classification Search
USPC ................................. 285/276, 272
See application file for complete search history.

(56) References Cited

U.S. PATENT DOCUMENTS

| | | | | |
|---|---|---|---|---|
| 2,396,123 A | * | 3/1946 | Phillips | 285/276 |
| 2,432,275 A | * | 12/1947 | Bels | 285/276 |
| 2,444,868 A | * | 7/1948 | Allen et al. | 285/276 |
| 3,264,006 A | * | 8/1966 | Downs | 285/276 |
| 3,314,694 A | * | 4/1967 | Faccou | 285/276 |
| 3,347,570 A | * | 10/1967 | Roessler | 285/276 |
| 3,514,127 A | * | 5/1970 | Brooker | 285/276 |
| 3,575,060 A | * | 4/1971 | Warren | 285/276 |
| 3,578,361 A | * | 5/1971 | Corrigan | 285/276 |
| 3,679,235 A | * | 7/1972 | Faccou | 285/276 |

(Continued)

FOREIGN PATENT DOCUMENTS

| | | |
|---|---|---|
| DE | 3307427 A1 | 10/1983 |
| DE | 29800317 | 5/1998 |
| GB | 742555 | 12/1955 |

OTHER PUBLICATIONS

Emco Wheaton D2000 PTFE Swivel Joint Data Sheet, May 2008; http://www.emcowheaton.com/assets/0/72/294/452/550/b9ca8aba-2dab-4c46-b647-ec22a512ea0e; last accessed Feb. 28, 2012.

(Continued)

*Primary Examiner* — David E Bochna
(74) *Attorney, Agent, or Firm* — Dinsmore & Shohl LLP

(57) ABSTRACT

A fluid handling swivel joint and fluid conveyance equipment incorporating the same includes a first flanged portion, a tail portion that form a conduit. The fluid handling swivel joint also includes a body secured to the first flanged portion and at least partially surrounding the tail portion, where the body and the tail portion form a raceway. The fluid handling swivel joint further includes a primary seal positioned between the first flanged portion and the tail portion, and a secondary seal positioned between the first flanged portion and the tail portion and radially outward of the primary seal. The fluid handling swivel joint also includes a first environmental seal and a second environmental seal positioned to contact two of the first flanged portion, the tail portion, and the body to form an isolated volume around the plurality of roller elements.

16 Claims, 30 Drawing Sheets

(56) References Cited

U.S. PATENT DOCUMENTS

| | | | |
|---|---|---|---|
| 3,768,840 A | | 10/1973 | Upton et al. |
| 3,820,830 A | | 6/1974 | Dryer |
| 3,884,511 A | * | 5/1975 | Hermanson .................. 285/276 |
| 3,967,842 A | * | 7/1976 | Kendrick ....................... 285/276 |
| 4,139,220 A | * | 2/1979 | Faccou et al. ................. 285/276 |
| 4,221,408 A | * | 9/1980 | Lochte et al. ................. 285/276 |
| 4,355,827 A | * | 10/1982 | Ehret ............................. 285/276 |
| 4,620,728 A | | 11/1986 | Barth et al. |
| 4,626,003 A | * | 12/1986 | Williams et al. ............. 285/276 |
| 5,799,953 A | | 9/1998 | Henderson |
| 5,851,034 A | | 12/1998 | Shah |
| 6,371,527 B1 | | 4/2002 | Ungchusri et al. |
| 7,770,899 B1 | | 8/2010 | Durham |

OTHER PUBLICATIONS

Emco Wheaton D2000 Swivel Joint Data Sheet, May 2008; http://www.emcowheaton.com/assets/0/72/294/452/550/08899ef0-8b06-41fe-8943-4aa205ff9aea; last accessed Feb. 28, 2012.
OPW 8000-Series Endura, Oct. 2009; http://www.opw-es.com/documents/opwes/documents/iomdocs/8000-series-endura-iom; last accessed Feb. 28, 2012.
International Search Report and Opinion, dated May 10, 2012 filed in International Application No. PCT/US2012/022341.

* cited by examiner

FLUID HANDLING SWIVEL JOINTS AND FLUID CONVEYANCE EQUIPMENT INCORPORATING THE SAME

CROSS-REFERENCE TO RELATED APPLICATIONS

The present application claims priority to U.S. Provisional Application Ser. Nos. 61/435,530 filed Jan. 24, 2011, titled "Fluid Handling Swivel Joints", 61/435,537 filed Jan. 24, 2011, titled "Low Profile Fluid Handling Swivel Joint", and 61/495,524 filed Jun. 10, 2011, titled "Fluid Handling Swivel Joints."

TECHNICAL FIELD

The present specification generally relates to fluid handling equipment and, more specifically, to swivel joints for fluid handling equipment.

BACKGROUND

Fluid handling equipment is used in a variety of industries for transporting fluid products from a first region to a second region. Depending on the application, rigid or flexible handling lines may be used to transport the fluid products.

Fluid handling swivel joints allow for fluid handling lines to be articulated through a variety of positions to accommodate transporting fluid product from a first region to a second region. Further, because the fluid handling swivel joints are used to convey chemicals, which may be volatile, the fluid handling components, including the fluid handling swivel joints, must have the interior passageways sealed to prevent the fluid products from leaking into the environment. Previous fluid handling swivels required a large force to rotate and were therefore difficult to articulate.

Accordingly, a need exists for improved fluid handling swivel joints and fluid conveyance equipment incorporating the same.

SUMMARY

In one embodiment, a fluid handling swivel joint includes a first flanged portion having an opening, a tail portion having an opening and a partial channel around an exterior diameter of the tail portion, where at least a portion of the tail portion is adjacent to the first flanged portion. The opening of the first flanged portion and the opening of the tail portion form a conduit. The fluid handling swivel joint also includes a body secured to the first flanged portion and at least partially surrounding the tail portion, where the body has a partial channel around an interior diameter of the body, and the partial channel of the tail portion and the partial channel of the body form a raceway. The fluid handling swivel joint further includes a plurality of roller elements positioned within the raceway, a primary seal positioned between the first flanged portion and the tail portion, and a secondary seal positioned between the first flanged portion and the tail portion and radially outward of the primary seal. The fluid handling swivel joint also includes a leak detection port having a leak detection tap positioned between the primary seal and the secondary seal and in fluid communication with the primary seal, and a first environmental seal and a second environmental seal positioned relative to the first flanged portion, the tail portion, and the body to form an isolated volume around the plurality of roller elements.

In another embodiment, a fluid handling swivel joint includes a first flanged portion having an opening and a tail portion having an opening and a partial channel around an exterior diameter of the tail portion, where at least a portion of the tail portion is adjacent to the first flanged portion. The opening of the first flanged portion and the opening of the tail portion form a conduit. The fluid handling swivel joint also includes a body secured to the first flanged portion and at least partially surrounding the tail portion, where the body has a partial channel around an interior diameter of the body, and the partial channel of the tail portion and the partial channel of the body form a raceway. The fluid handling swivel joint further includes a plurality of roller elements positioned within the raceway, a primary seal positioned between the first flanged portion and the tail portion and extending radially inwards from the opening of the tail portion, a secondary seal positioned between the first flanged portion and the tail portion and radially outward of the primary seal, and a first environmental seal and a second environmental seal positioned relative to the first flanged portion, the tail portion, and the body to form an isolated volume around the plurality of roller elements.

In yet another embodiment, a fluid conveyance apparatus includes a fluid handling swivel joint that includes a first flanged portion having an opening, and a tail portion having an opening and a partial channel around an exterior diameter of the tail portion, where at least a portion of the tail portion is adjacent to the first flanged portion. The opening of the first flanged portion and the opening of the tail portion form a conduit. The fluid handling swivel joint further includes a body secured to the first flanged portion and at least partially surrounding the tail portion, where the body includes a partial channel around an interior diameter of the body. The partial channel of the tail portion and the partial channel of the body form a raceway. The fluid handling swivel joint includes a plurality of roller elements positioned within the raceway. The fluid handling swivel joint further includes a primary seal positioned between the first flanged portion and the tail portion, a secondary seal positioned between the first flanged portion and the tail portion and radially outward of the primary seal, and a first environmental seal and a second environmental seal positioned relative to the first flanged portion, the tail portion, and the body to form an isolated volume around the plurality of roller elements. The fluid conveyance apparatus further includes a first fluid handling pipe coupled to the first flanged portion and a second fluid handling pipe coupled to the tail portion, where an exterior surface of the first fluid handling pipe is positioned within the opening of the flanged portion and the second fluid handling pipe is positioned within the opening of the tail portion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals.

DETAILED DESCRIPTION

The embodiments described herein are directed to improved fluid handling swivel joints for fluid conveyance equipment. The fluid handling swivel joints may include a low-friction member in the primary seals that reduces wear on mechanical sealing members. The fluid handling swivel joints also include leak detection ports that are in fluid communication with the primary seals, such that any fluid product that leaks past the primary seals collects in the leak detection ports.

Figure 1:
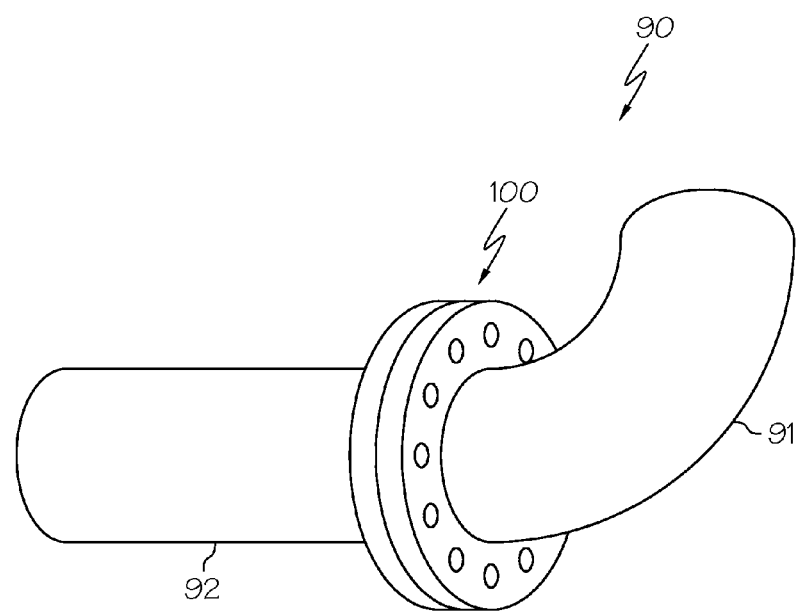
FIG. 1 depicts a schematic representation of fluid conveyance equipment according to one or more embodiments shown and described herein.

Referring to FIG. 1, an embodiment of fluid conveyance equipment 90, including a fluid handling swivel joint 100 is depicted. The fluid handling swivel joint 100 is attached to a first fluid handling pipe 91 and a second fluid handling pipe 92. The fluid handling swivel joint 100 allows the first fluid handling pipe 91 and the second fluid handling pipe 92 to rotate relative to one another while maintaining a fluid-tight seal that prevents fluid product from leaking from the fluid conveyance equipment 90 into the environment.

Figure 2:
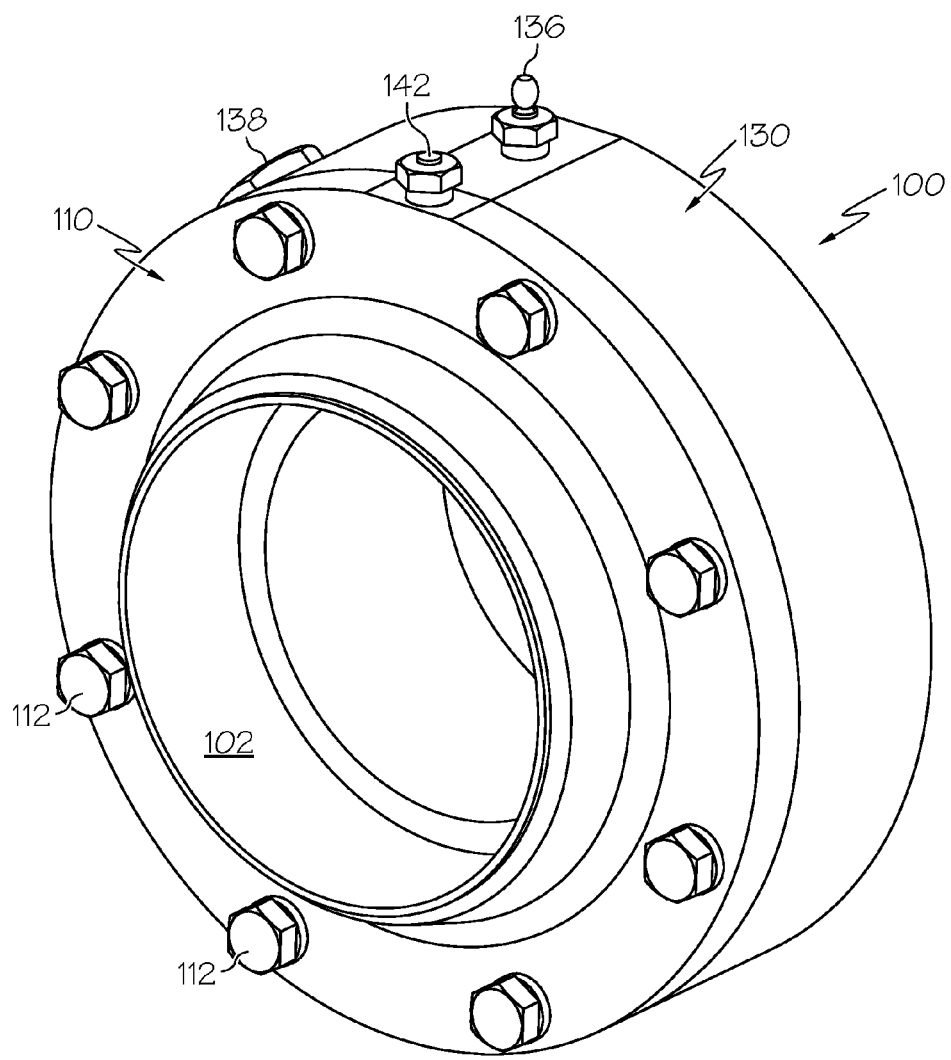
FIG. 2 depicts a schematic representation of a fluid handling swivel joint according to one or more embodiments shown and described herein.
Figure 3:
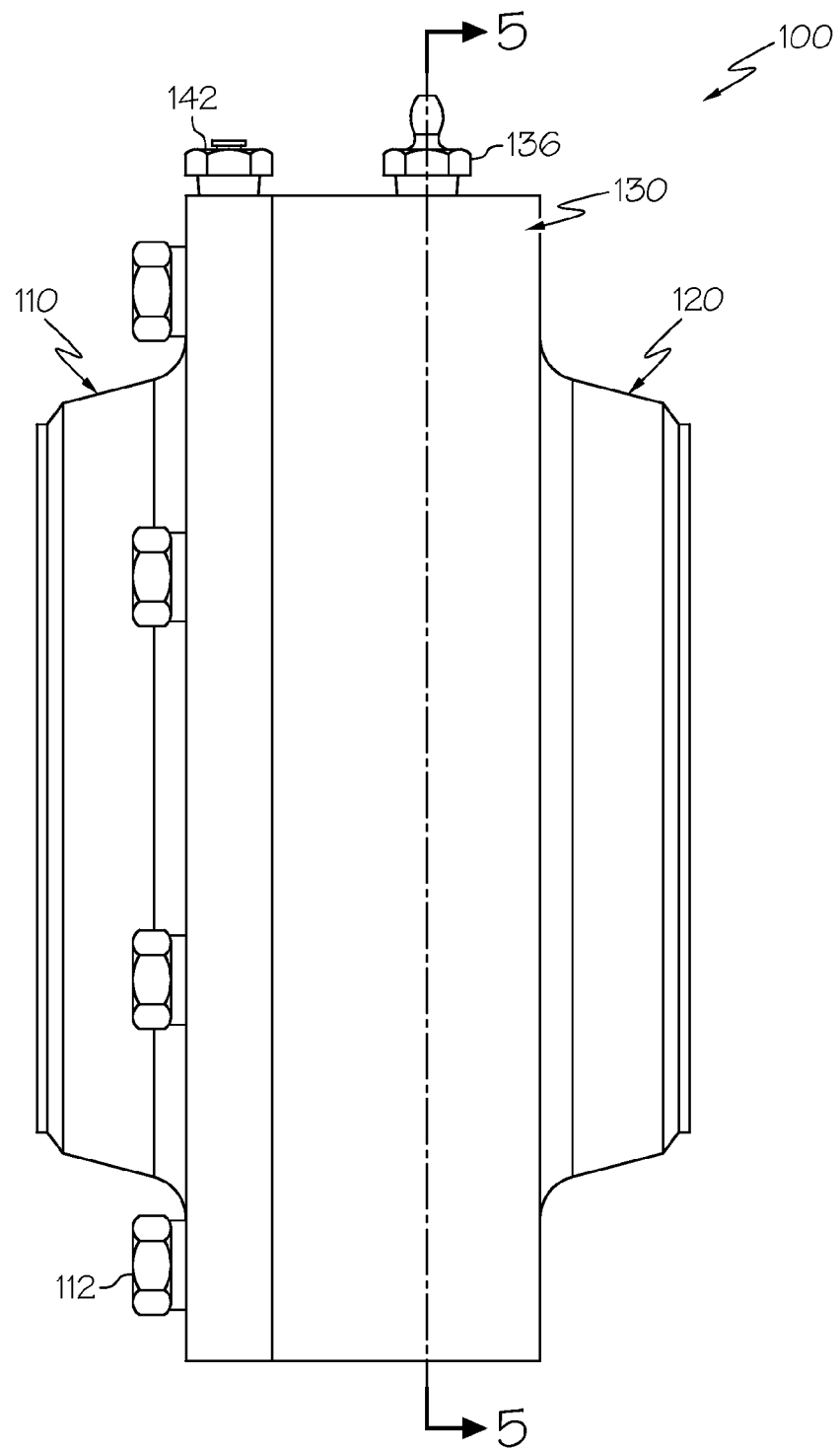
FIG. 3 depicts a schematic representation of a fluid handling swivel joint according to one or more embodiments shown and described herein.

One embodiment of a fluid handling swivel joint 100 is depicted in FIGS. 2-5. Referring now to FIGS. 2 and 3, the fluid handling swivel joint 100 includes a first flanged portion 110 that may be coupled to a first fluid handling pipe 91 (see FIG. 1) and a tail portion 120 that may be coupled to a second fluid handling pipe 92 (see FIG. 1). The tail portion 120 is at least partially surrounded by a body 130. As depicted, the body 130 is fastened to the first flanged portion 110 by a plurality of fasteners 112.

Figure 4A:
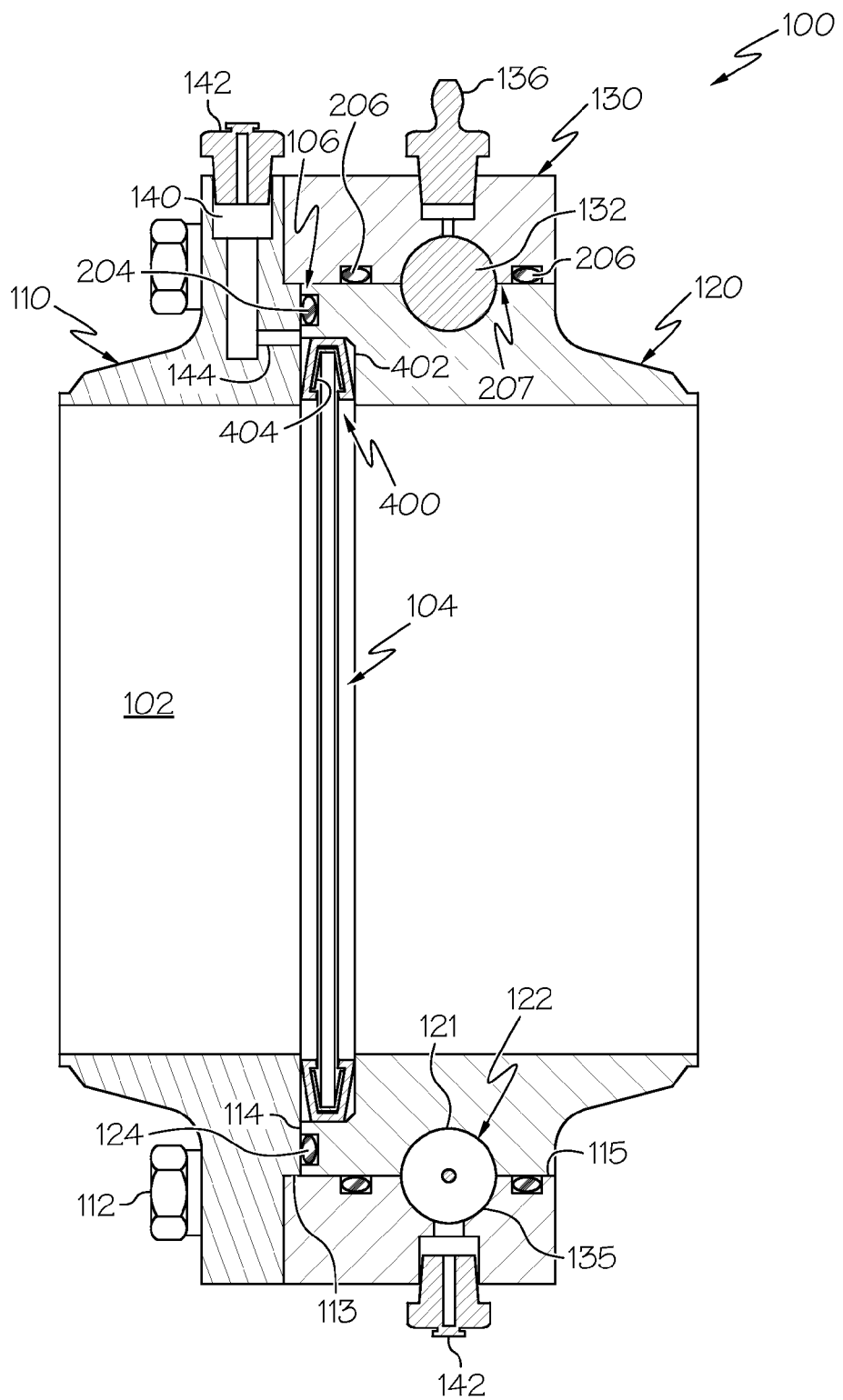
FIG. 4A depicts a schematic representation of a cross-section of a fluid handling swivel joint according to one or more embodiments shown and described herein.

As further depicted in FIG. 4A, the body 130 of this embodiment is an annular member that includes a partial channel 135 formed in an interior-facing diameter of the body 130. The tail portion 120 includes a partial channel 121 that is located on an exterior-facing diameter of the tail portion 120. When the body 130 is assembled over the tail portion 120 and aligned in the correct axial location, the partial channel 121 on the tail portion 120 and the partial channel 135 on the body 130 align to form a raceway 122 having a generally toroidal shape.

The flanged portion 110 includes a step 113 located circumferentially outside of the mating surface 114 of the flanged portion 110. The step 113 mates with the inner diameter 115 of the body 130 and provides an interface between the flanged portion 110 and the body 130. In the event that the fasteners 112 loosen from the body 130, the step 113 may continue to engage the flanged portion 110 with the body 130. In one embodiment, the step 113 and the inner diameter 115 of the body 130 are arranged with a clearance fit. In the event of the fasteners 112 loosening from the body 130, a slight misalignment of the flanged portion 110 and the body 130 engages the components with one another. In another embodiment, the step 113 of the flanged portion 110 and the inner diameter 115 of the body 130 are arranged with an interference fit, such that if the fasteners 112 loosen from the body 130, the interference fit continues to engage the flanged portion 110 and the body 130 with one another. Because the step 113 continues to engage the flanged portion 110 with the body 130 after the fasteners 112 are loosened, the step 113 in the flanged portion 110 may transfer a shear force between the flanged portion 110 and the body 130. As such, the step interface between the flanged portion 110 and the body 130 created by the step 113 may minimize any shear force introduced into the fasteners 112. In addition, the step 113 may assist with aligning the flanged portion 110 and the body 130 during the assembly of the fluid handling swivel joint 100.

Without being bound by theory, introducing a shear force into threaded fasteners is often disfavored. Threaded fasteners include a minor diameter in the thread-form that reduces the cross-sectional area of the fastener that is capable of resisting an applied shear force. Additionally, the thread-form itself may include a stress concentration at the root of the threads that further reduces the amount of shear force that the threaded fastener can resist. Accordingly, introducing shear force into the fasteners 112 may lead to premature failure of the fasteners 112. Thus, engaging the flanged portion 110 with the body 130 through the step 113 may allow the fluid handling swivel joint 100 to continue to operate in the event that the fasteners 112 loosen from the body 130 because an applied shear force will be carried through the interface between the flanged portion 110 and the body 130, and not through the fasteners 112.

Figure 5A:
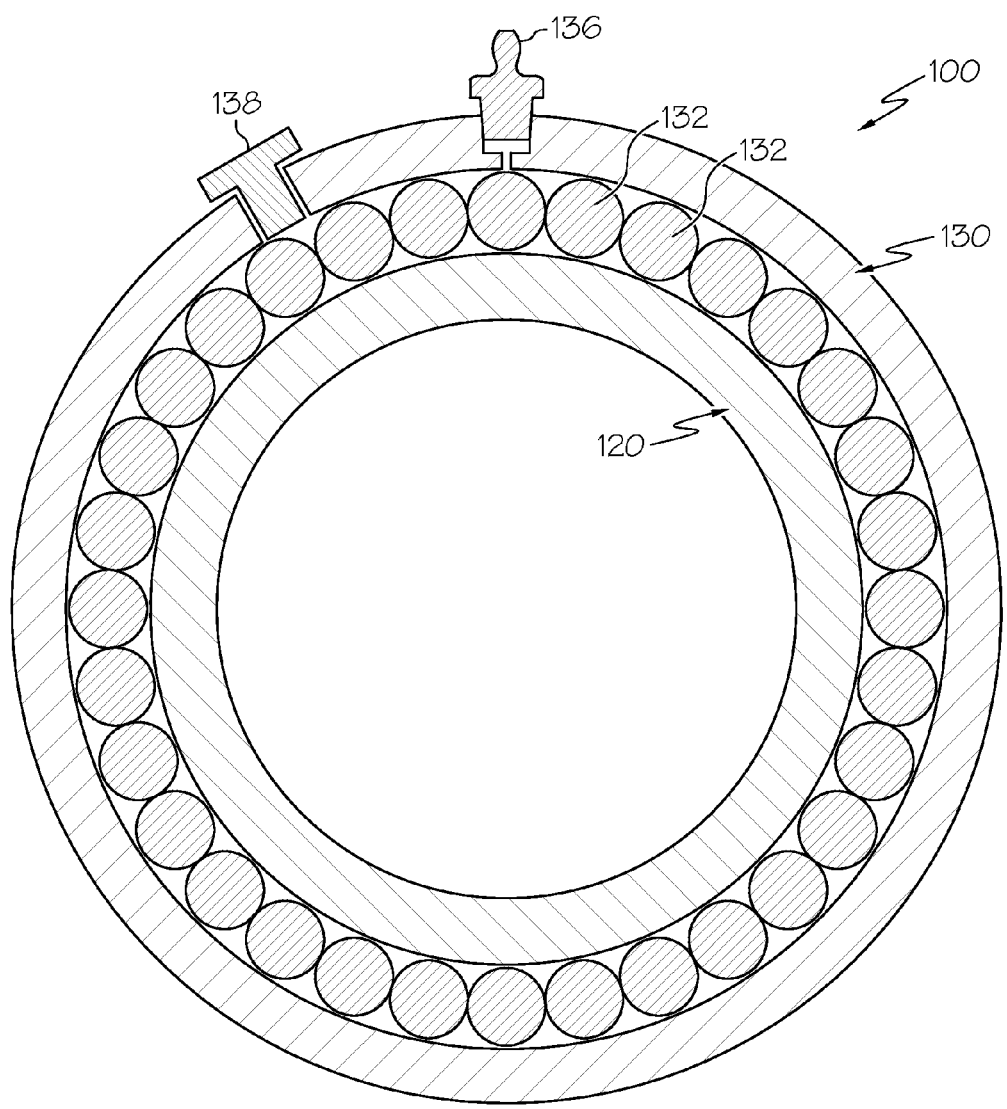
FIG. 5A depicts a schematic representation of a cross-section of a fluid handling swivel joint according to one or more embodiments shown and described herein.
Figure 5B:
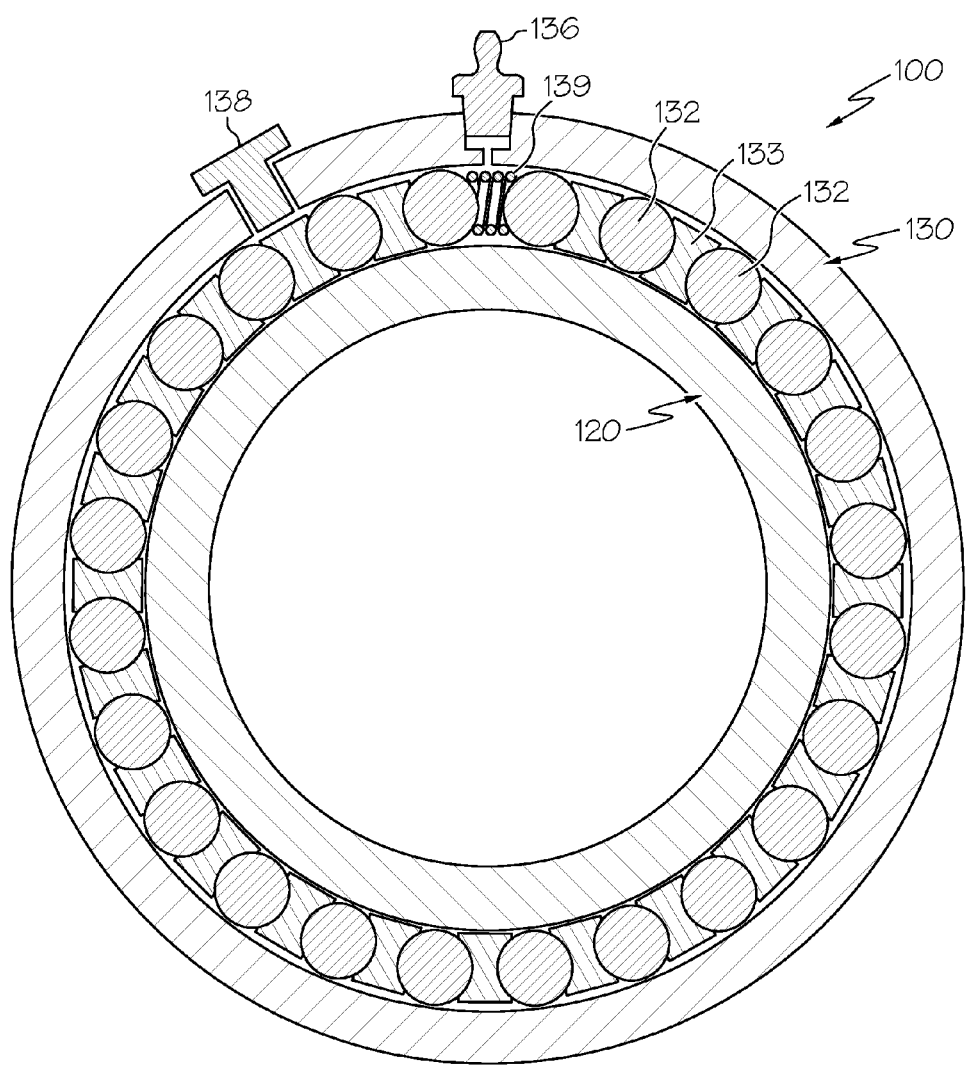
FIG. 5B depicts a schematic representation of a cross-section of a fluid handling swivel joint according to one or more embodiments shown and described herein.

Referring to FIGS. 4A and 5A, a plurality of roller elements 132 are inserted into the raceway 122 formed by the body 130 and the tail portion 120. The roller elements 132 align the body 130 axially and radially relative to the tail portion 120 based on contact between the roller elements 132 and the partial channel 121 on the tail portion 120 and the partial channel 135 on the body 130. The roller elements 132 allow the body 130 and the first flanged portion 110, which is coupled to the body 130, to rotate relative to the tail portion 120. The roller elements 132 maintain the concentric spacing of the body 130 relative to the tail portion 120, thereby minimizing any contact between the exterior-facing diameter of the tail portion 120 and the interior-facing diameter of the body 130. The roller elements 132 also maintain the axial spacing of the body 130 relative to the tail portion 120, which, therefore, maintains the axial position of the first flanged portion 110 relative to the tail portion 120, thereby limiting any relative translational movement between the tail portion 120 and the first flanged portion 110. The roller elements 132 are inserted into the raceway 122 through a raceway port, which is capped and sealed with a plug 138. The plug 138 prevents the roller elements 132 from being displaced from the raceway 122 during normal operation. Additionally, the plug 138 allows access to the roller elements 132 for removal during servicing.

A nipple 136 may be positioned along an exterior surface of the body 130 such that the nipple 136 is in fluid communication with the raceway 122 and the roller elements 132. Lubricant, for example grease, may be introduced into the raceway 122 through the nipple 136 without requiring disassembly of the plug 138 from the body 130, or requiring disassembly of the body 130 from the tail portion 120. Additionally, a pressure relief fitting 142 that allows excess lubricant or excessive internal pressure to escape from the raceway 122 may be installed into the body 130 in fluid communication with the raceway 122.

The first flanged portion 110, the tail portion 120, and the body 130 are made from materials that are inert to fluid products that pass through the fluid handling swivel joint 100. The materials also have sufficient strength and stiffness to overcome any loads that are applied to the fluid handling swivel joint 100. Examples of such materials include, but are not limited to, carbon steels and stainless steels. Examples of such fluid products that are carried through fluid handling equipment include liquid hydrocarbons, liquid petroleum products, petrochemicals, water, solvents, liquid food products, alcohol, fertilizers, acids, waste solids, dissolved solids, and combinations thereof. The fluid products may also include solids that are capable of flowing through a length of pipe, including, without limitation, pelletized fertilizers, processed and unprocessed grains, and cement. The products carried through fluid handling equipment may include liquids, solids, gases, or combinations thereof.

As further depicted in FIG. 4A, the fluid handling swivel joint 100 also includes a plurality of seals that are arranged between adjacent components of the fluid handling swivel joint 100. The fluid handling swivel joint 100 includes a primary seal 104 and a secondary seal 106 that is positioned radially outwards from the primary seal 104. The primary seal 104 and the secondary seal 106 form a fluid-tight connection between the first flanged portion 110 and the tail portion 120 that prevents leakage from the fluid handling swivel joint 100 when the first flanged portion 110 and the tail portion 120 move dynamically relative to one another. In the embodiment depicted in FIG. 4A, the primary seal 104 is a spring energized seal 400 that includes a jacket 402 and a spring 404. The jacket 402 may be a variety of materials including elastomers such as Viton®, Buna-N, EPDM, Kalrez®, PTFE, or neoprene. The spring 404 may be made from a variety of resilient materials including, without limitation, spring steel, plastic, or PTFE. The spring energized seal 400 is positioned in an annular seat formed in the tail portion 120 such that a portion of the jacket 402 contacts the first flanged portion 110 while a portion of the jacket 402 contacts the tail portion 120. In an unrestrained state, a maximum side-to-side thickness dimension of the spring energized seal 400 may be greater than a distance of the annular seat formed in the tail portion 120. Thus, when the spring energized seal 400 is installed into the annular seat, the first flanged portion 110 and the tail portion 120 compress the jacket 402 and the spring 404 of the spring energized seal 400. The spring energized seal 400, therefore, prevents fluid product from escaping from the conduit 102 through which fluid product flows into the environment by forming a fluid-tight seal between the first flanged portion 110 and the tail portion 120. In addition, for certain applications where the fluid product flowing through the conduit 102 is at an elevated pressure, the pressure of the fluid tends to apply a force to the spring energized seal 400 in a direction that corresponds to opening the jacket 402 into the first flanged portion 110 and the tail portion 120. The pressure of the fluid product, therefore, may increase the sealing force between the jacket 402 and the annular seat.

As discussed above, the fluid handling swivel joint 100 also includes a secondary seal 106, which creates a redundant seal between the first flanged portion 110 and the tail portion 120. In the embodiment depicted in FIG. 4A, the secondary seal 106 is a secondary O-ring 204 that is located radially outwards from the primary seal 104. The secondary O-ring 204 is positioned in an O-ring gland formed in the tail portion 120 such that the secondary O-ring 204 seals to a mating surface 114 of the first flanged portion 110 and to a mating surface 124 of the tail portion 120. In the event that the sealing ability of the primary seal 104 is compromised, the secondary O-ring 204 continues to maintain a fluid-tight seal between the first flanged portion 110 and the tail portion 120, thereby preventing any fluid product from leaking out of the fluid handling swivel joint 100. O-rings may be used throughout the fluid handling swivel joint 100 to provide sealing between adjacent components, and may be selected from commercially available materials based on the intended end-user application. Examples of such materials include, without limitation, elastomers such as Viton®, Buna-N, EPDM, Kalrez®, and PTFE. Further, O-rings may be made available for end-users to modify the fluid handling swivel joints 100 when changing the end-user application.

The fluid handling swivel joint 100 also includes two environmental seals 206. As depicted in FIG. 4A, the two environmental seals 206 are arranged between the body 130 and the tail portion 120, such that the raceway 122 is positioned between the environmental seals 206. The environmental seals 206 form an isolated volume 207 around the plurality of raceways 122. In the embodiment depicted in FIG. 4A, the environmental seals 206 are positioned in glands formed in the interior diameter of the body 130. However, other positions of the glands are contemplated, as discussed herein. The environmental seals 206 prevent environmental debris such as water and dust from entering the isolated volume 207 surrounding the raceway 122 and/or the conduit 102 formed by the first flanged portion 110 and the tail portion 120. If this environmental debris were permitted to enter the raceway 122, the ability of the roller elements 132 to freely roll within the raceway 122 may be reduced, which may degrade the roller elements 132 and the raceway 122 itself. Additionally, the environmental seals 206 may prevent any lubricant in the raceway 122 (i.e., lubricant introduced through the nipple 136) from being introduced into the environment. A pressure relief fitting installed into the body 130 and in fluid communication with the raceway 122 may allow excess pressure that builds in the raceway 122 to be relieved. If the fluid product being conveyed through the fluid handling swivel joint 100 is at an elevated temperature, for example heated asphalt, the fluid product may heat the lubricant in the raceway 122. Heating the lubricant may lead to expansion of the lubricant and/or outgassing of the lubricant, which increases the pressure of the fluid within the raceway 122. If not relieved, this increase in pressure may cause the environmental seals 206 to distort or to be displaced from their glands, thereby allowing release of lubricant from the isolated volume 207 or allowing introduction of contaminants to the isolated volume 207.

The fluid handling swivel joint 100 further includes a leak detection port 140. As depicted in FIG. 4A, the leak detection port 140 is in fluid communication with the space between the primary seal 104 and the secondary seal 106. The leak detection port 140 includes a leak detection tap 144 positioned between the primary seal 104 and the secondary seal 106, such that the leak detection tap 144 is in fluid communication with the primary seal 104. The leak detection port 140 provides a region for any fluid products that have leaked from the conduit 102 past the primary seal 104 to collect. Collecting the leaked fluid products allows for visual inspection of the leak detection port 140 to determine if the primary seal 104 has been compromised. A pressure relief fitting 142 may be fitted to the leak detection port 140. Additionally or in the alternative, for applications where any leakage of fluid product is undesirable, a purge gas may be introduced to the leak detection port 140 using a purge fitting. In such a case, the purge gas is introduced to the leak detection port 140 at a higher pressure than the fluid product. In the event that the primary seal 104 has compromised sealing performance, the gas would flow past the primary seal 104 and into the flow of fluid product through the conduit 102, thereby preventing any fluid product from entering the environment. Additionally or in the alternative, purge gas may be introduced to the leak detection port 140 through a purge fitting, where the purge is inert to the fluid product. The use of an inert purge gas acts as a buffer that maintains separation between the fluid product carried in the conduit 102 and the ambient air. An inert purge gas may be introduced to the leak detection port 140 when the fluid product is reactive with air.

In another embodiment of the fluid handling swivel joint 100, a pressure sensor (not shown) may be added to the leak detection port 140, such that the pressure sensor is in fluid communication with the spring energized seal 400 and the secondary O-ring 204. The pressure sensor may be able to detect an increase in pressure in the fluid cavity between the primary seal 104 and the secondary seal 106. The increased pressure measured at the leak detection port 140 may correspond with fluid products leaking past the primary seal 104, which may indicate compromised sealing performance of the primary seal 104. The pressure sensor may be in electronic communication with an electronic control unit, which may be in electronic communication with a pump used to transfer fluid products through the conduit 102. In cases where the pressure sensor measures an increase in pressure at the leak detection port 140, the pressure sensor may transmit a signal to the electronic control unit, which may command the pump to stop pumping.

Figure 4B:
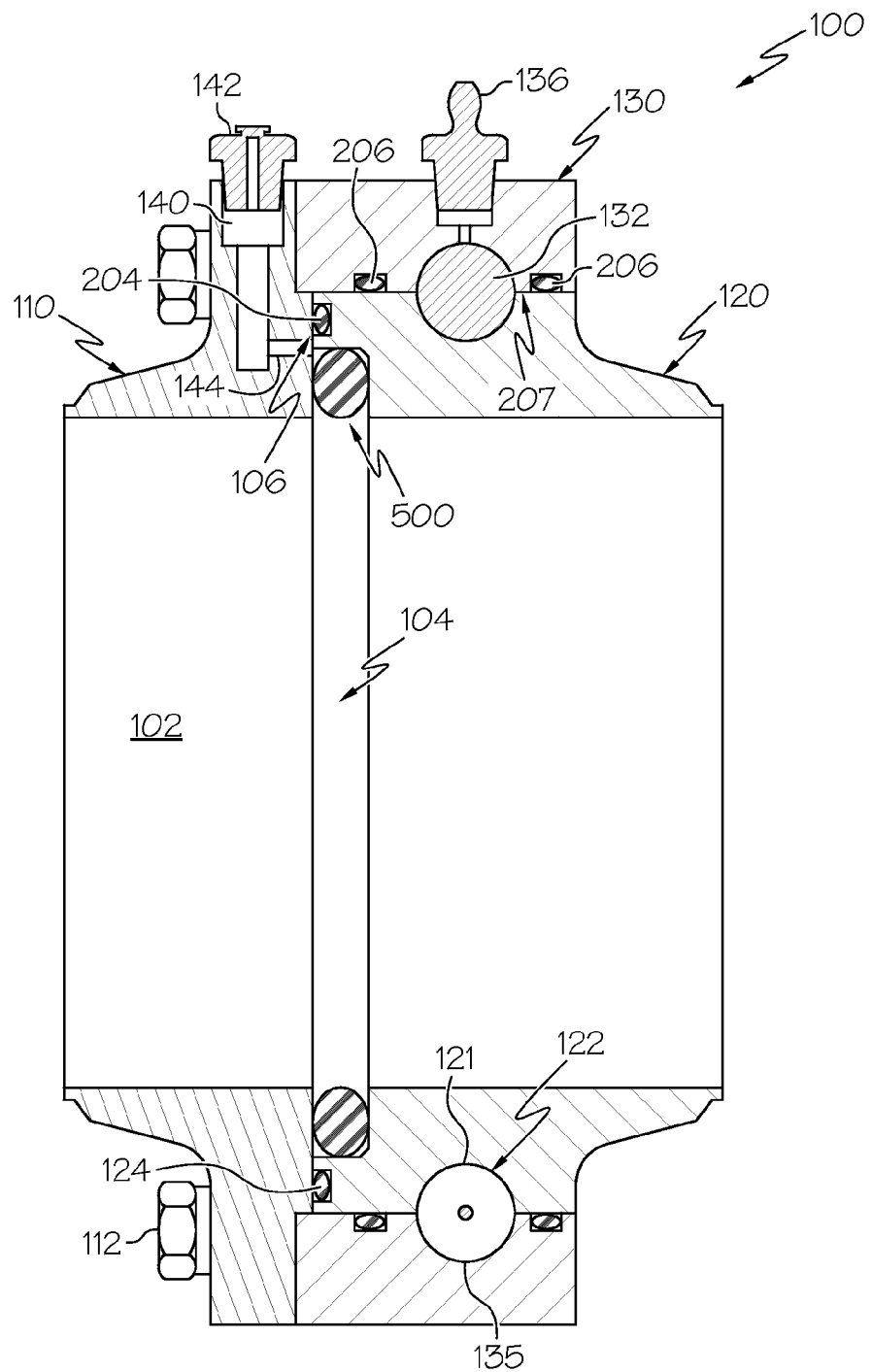
FIG. 4B depicts a schematic representation of a cross-section of a fluid handling swivel joint according to one or more embodiments shown and described herein.

Another embodiment of the fluid handling swivel joint 100 is depicted in FIG. 4B. This embodiment is similar to the embodiment described above in regard to FIGS. 2-4A, but with a principal O-ring 500 acting as the primary seal 104. The principal O-ring 500 forms a seal between the faces of the annular seat formed in the tail portion 120 and the first flanged portion 110. The principal O-ring 500 prevents fluid from escaping from the conduit 102 into the environment by forming a fluid-tight seal between the first flanged portion 110 and the tail portion 120. Other cross-sectional shapes of principal O-rings 500, including square and X-shaped, are contemplated.

Figure 4C:
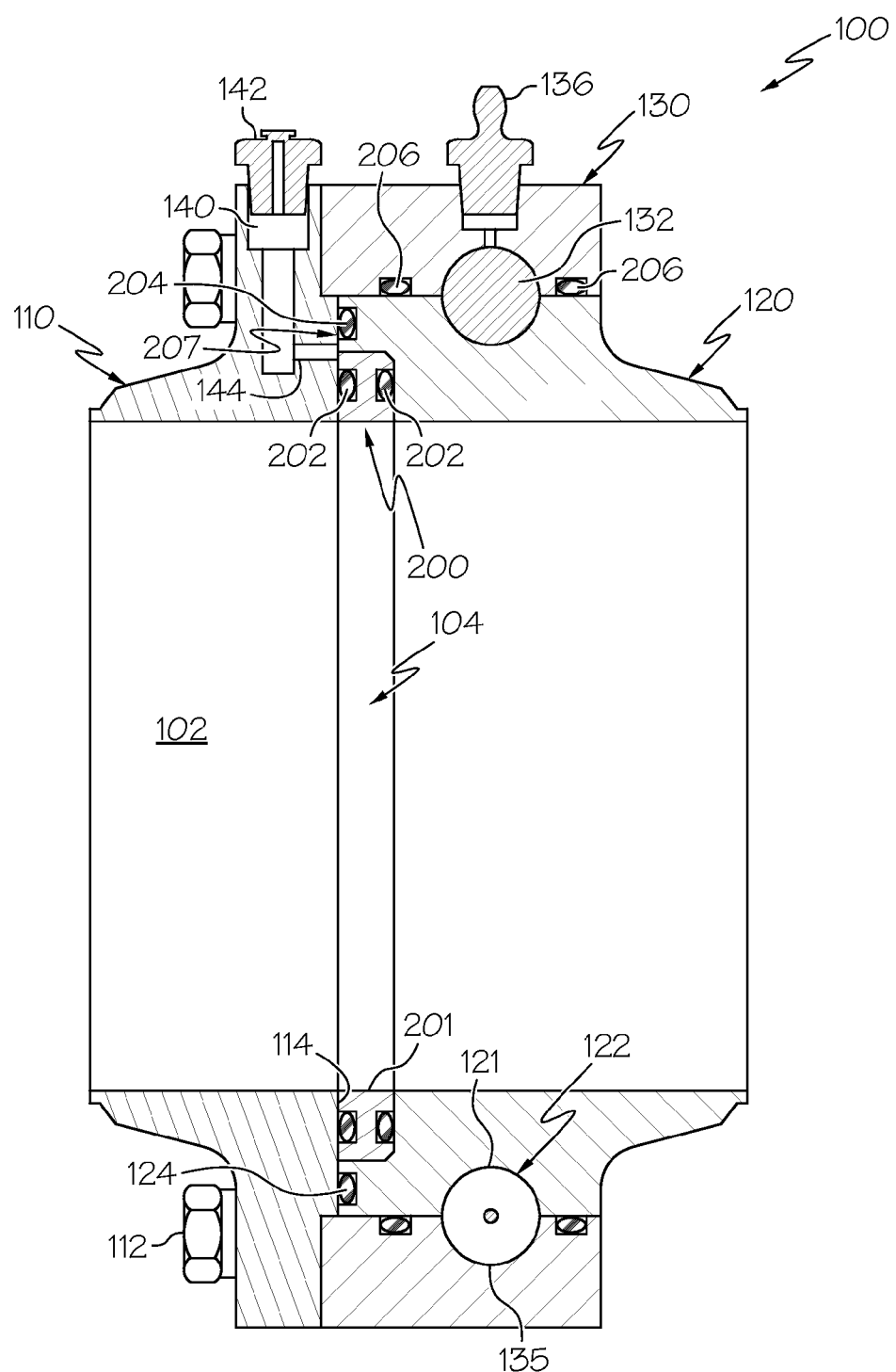
FIG. 4C depicts a schematic representation of a cross-section of a fluid handling swivel joint according to one or more embodiments shown and described herein.

Another embodiment of the fluid handling swivel joint 100 is depicted in FIG. 4C. This embodiment is similar to the embodiment described above in regard to FIGS. 2-4A, but with a primary seal assembly 200 acting as the primary seal 104. The primary seal assembly 200 includes an seal block 201 having an "H"-shaped cross-section and two primary O-rings 202 that are positioned within O-ring glands formed in the seal block 201. The primary seal assembly 200 is positioned in an annular seat formed in the tail portion 120 such that a first primary O-ring 202 contacts the first flanged portion 110 while a second primary O-ring 202 contacts the tail portion 120. The seal block 201 has an interior diameter that is about equal to the interior diameter of both the first flanged portion 110 and the tail portion 120, such that the interior diameters of the first flanged portion 110, the seal block 201, and the tail portion 120 form the conduit 102 that fluid products pass through. The primary O-rings 202, therefore, prevent fluid from escaping from the conduit 102 into the environment by forming a fluid-tight seal between the first flanged portion 110 and the tail portion 120.

In the embodiment of the fluid handling swivel joint 100 depicted in FIG. 4C, the seal block 201 is made from a polymer material, such as polytetrafluoroethylene (PTFE). PTFE is generally inert with respect to fluid chemicals that are typically passed through the fluid handling swivel joint 100. PTFE generally has a lower coefficient of friction than carbon steel or stainless steel, from which the first flanged portion 110 and the tail portion 120 are constructed. Because the primary O-rings 202 abut both the lower coefficient of friction seal block 201 and the higher coefficient of friction first flanged portion 110 and tail portion 120, when the first flanged portion 110 rotates relative to the tail portion 120, the primary O-rings 202 have a tendency to move (i.e., slide) relative to the seal block 201 while maintaining their positions (i.e., stick) relative to the first flanged portion 110 or tail portion 120, respectively. By sliding the primary O-rings 202 along the low-friction seal block 201, the force required to rotate the first flanged portion 110 relative to the tail portion 120 is reduced as compared to a fluid handling swivel joint 100 that does not include an seal block 201 made from a low-friction material. Additionally, primary O-rings 202 that abut a low-friction material, such as a PTFE seal block 201, may have increased life as compared to O-rings that do not abut low-friction material, because the reduction in friction of the low-friction seal block 201 decreases the mechanism that typically causes wear in dynamic O-rings, such as the primary O-rings 202.

It should be understood that any primary seal 104 configuration, including a spring energized seal 400 as depicted in FIG. 4A, a principal O-ring 500 as depicted in FIG. 4B, or a primary seal assembly 200 as depicted in FIG. 4C, may be incorporated into other embodiments of the fluid handling swivel joints 100 based on the requirements of a particular end-user application.

The embodiments of the fluid handling swivel joint 100 depicted in FIGS. 2-5A may be assembled according to the following procedure. The environmental seals 206 are first installed into glands in the body 130. The tail portion 120 is installed into the body 130 such that the partial channels 121, 135 are axially aligned to form the raceway 122. The roller elements 132 are inserted into the raceway 122 and retained in the raceway 122 by the plug 138. The nipple 136 and a pressure relief fitting (not shown) are installed into openings in the body 130 and lubricant may be introduced into the raceway 122 through the nipple 136. The primary seal 104 is installed into the annular seat of the tail portion 120. The secondary seal 106 is installed into the tail portion 120 and the first flanged portion 110 is aligned with and fastened to the body 130 by the plurality of fasteners 112. Finally, a pressure relief fitting 142 is fitted to the first flanged portion 110.

Because the roller elements 132 are inserted in to the raceway 122 after the tail portion 120 and the body 130 have been assembled, a cage need not be included to maintain the spacing between the roller elements 132. Instead, the roller elements 132 of these fluid handing swivel joints 100 maintain their spacing by direct contact with one another. As depicted in FIG. 5A, the partial channel 121 of the tail portion 120 and the partial channel 135 of the body 130 may be formed such that the roller elements 132 fit within the raceway 122 without a need for additional support. In another embodiment depicted in FIG. 5B, a plurality of spacers 133 may be inserted in to the raceway 122 between adjacent roller elements 132. Additionally, a spring 139 may be inserted between two roller elements 132 to maintain contact between adjacent roller elements 132 and spacers 133. The spring 139 exerts a force to the adjacent roller elements 132 in a circumferential direction. The force applied to the roller elements 132 by the spring 139 is sufficient to bias adjacent roller elements 132 and spacers 133 to remain in contact with one another as the body 130 rotates relative to the tail portion 120.

Figure 6:
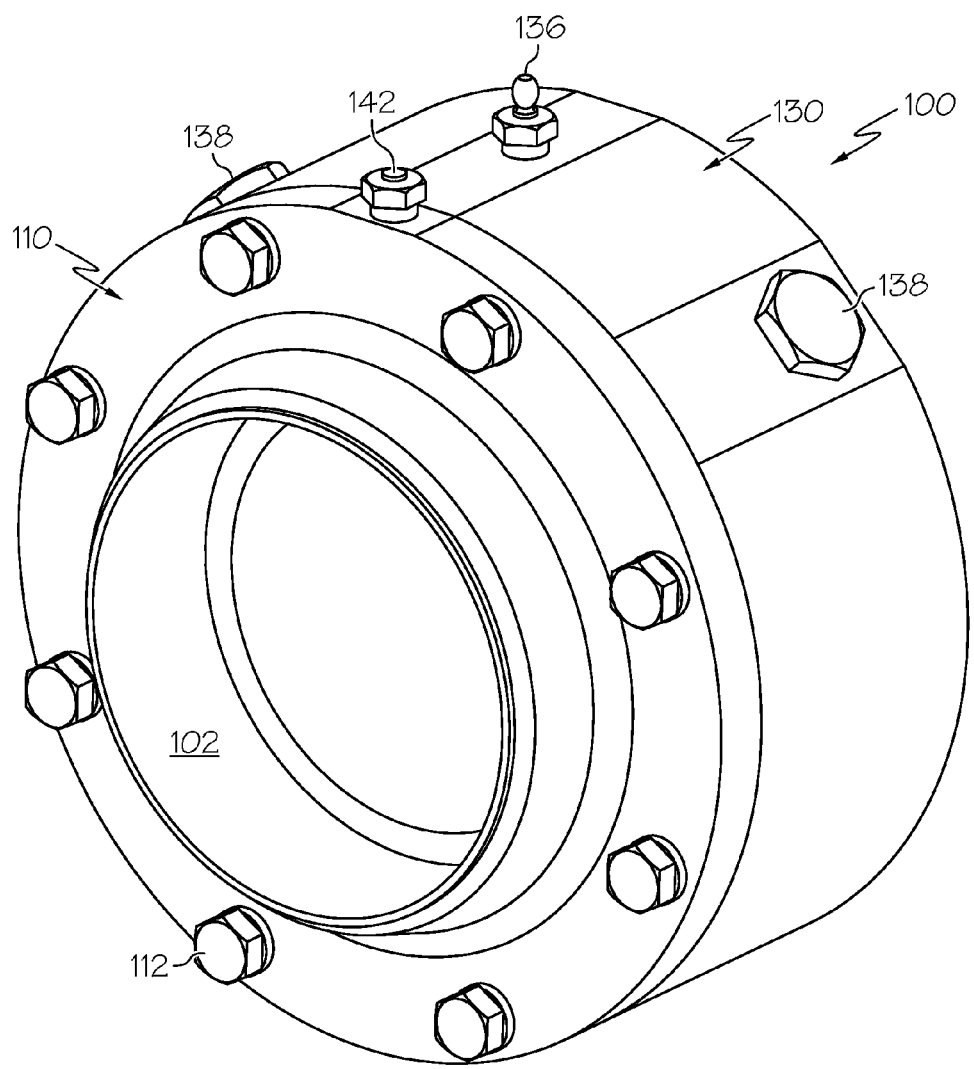
FIG. 6 depicts a schematic representation of a fluid handling swivel joint according to one or more embodiments shown and described herein.
Figure 7:
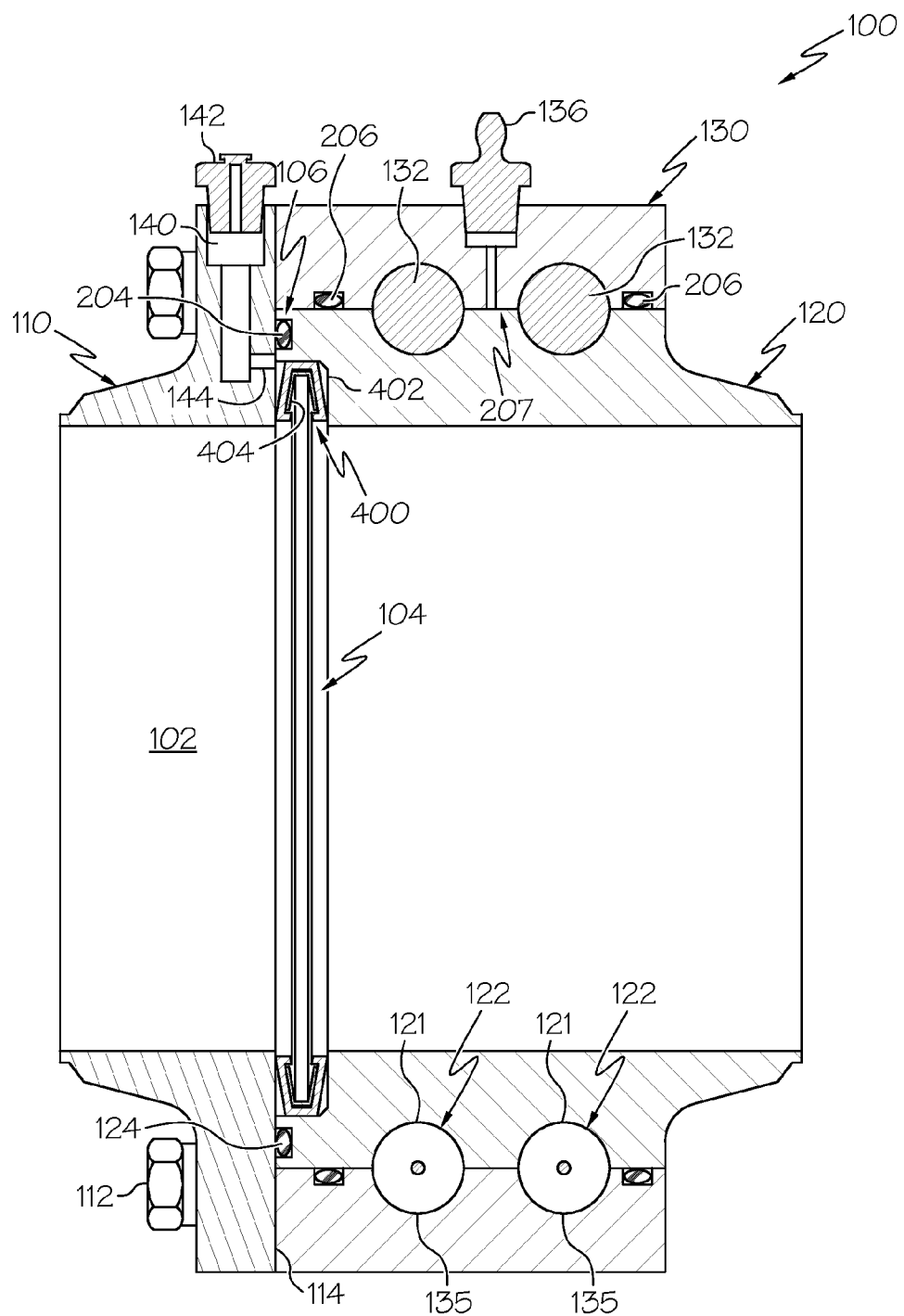
FIG. 7 depicts a schematic representation of a cross-section of a fluid handling swivel joint according to one or more embodiments shown and described herein.
Figure 8:
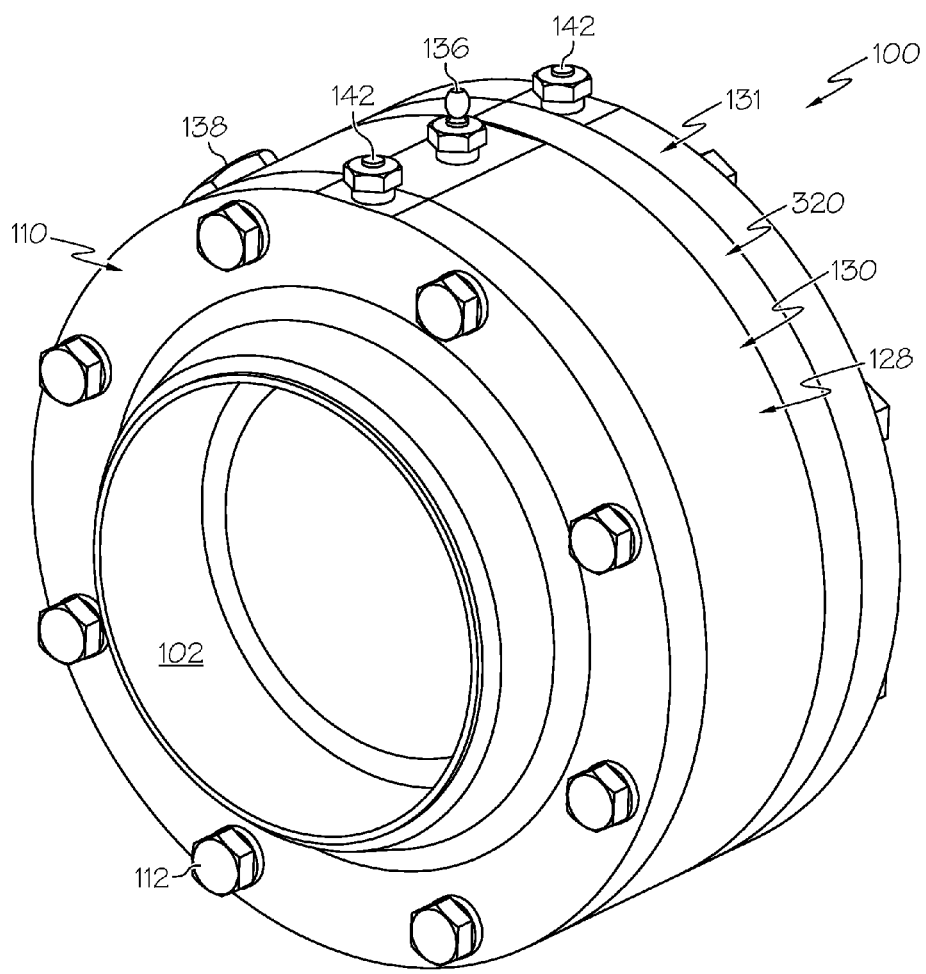
FIG. 8 depicts a schematic representation of a fluid handling swivel joint according to one or more embodiments shown and described herein.
Figure 9:
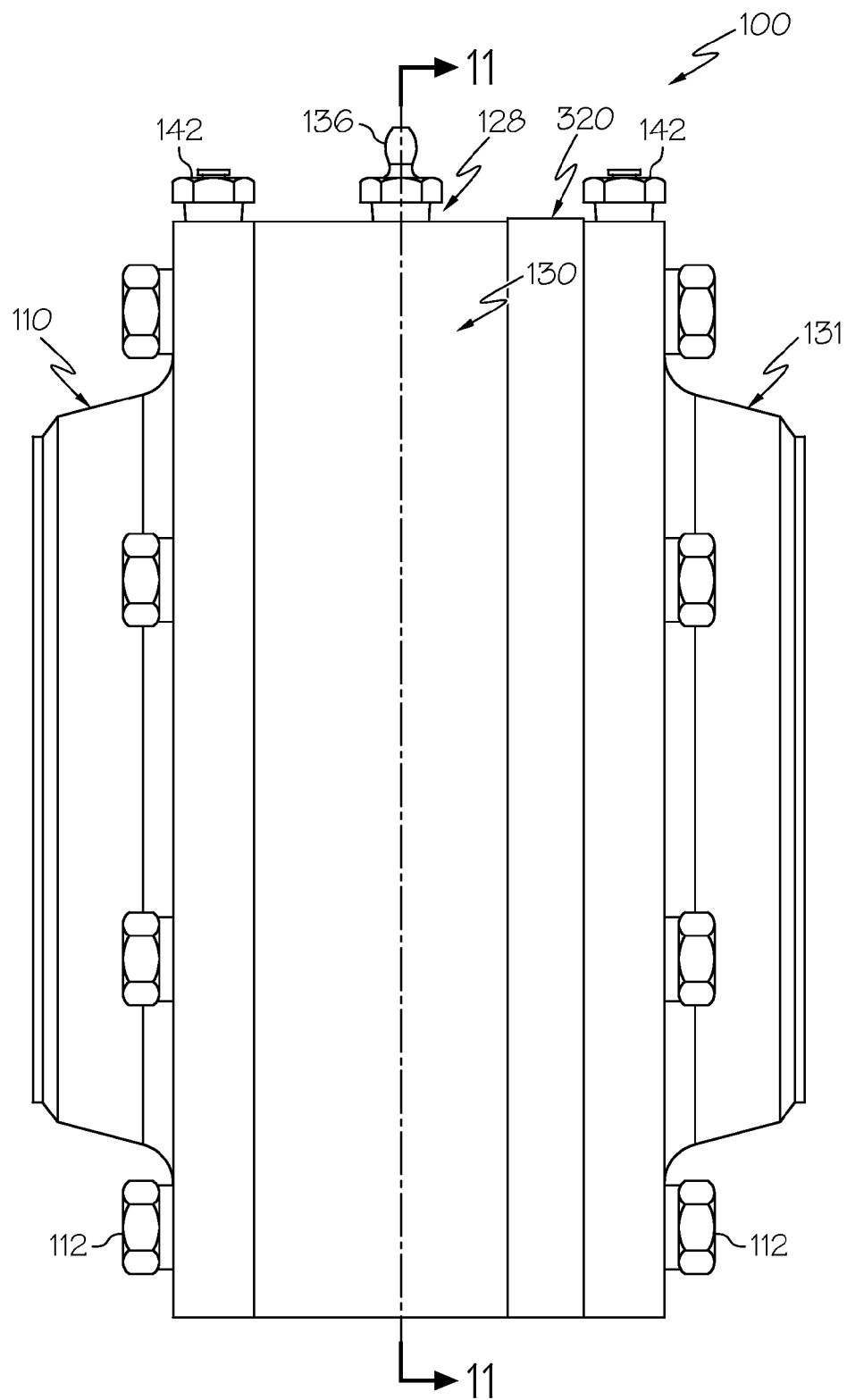
FIG. 9 depicts a schematic representation of a fluid handling swivel joint according to one or more embodiments shown and described herein.

Another embodiment of the fluid handling swivel joint 100 is depicted in FIGS. 6 and 7. In this embodiment, both the body 130 and the tail portion 120 include two partial channels 121, 135, and when the partial channels 121, 135 are aligned, the body 130 and the tail portion 120 form two raceways 122. Roller elements 132 are inserted into the two raceways 122 and retained in the raceways 122 by two plugs 138. By including two rows of roller elements 132, loads applied to the fluid handling swivel joint 100 can be distributed along a greater area than a single row of roller elements 132, which may allow the fluid handling swivel joint 100 to be used in applications with increased loading conditions. This may be important as the length, and therefore the weight, of the attached fluid conveyance equipment 90 (see FIG. 1) increases, along with a corresponding increase in the volume of the fluid products that is conveyed. Additionally, by including two rows of roller elements 132, the fluid handling swivel joint 100 may be able to resist increased moment loads applied to the fluid conveyance equipment 90 that the fluid handling swivel joint 100 is incorporated into.

As depicted in FIG. 7, the environmental seals 206 forming the isolated volume 207 are positioned such that both of the raceways 122 and the roller elements 132 are located between the environmental seals 206. Additionally, the nipple 136 is positioned along the body 130 and configured such that lubricant introduced through the nipple 136 enters both raceways 122 to lubricate both sets of roller elements 132 positioned within the raceways 122.

The first flanged portion 110 depicted in FIG. 7 does not include a step along the face that mates with the tail portion 120 and the body 130. Embodiments of the fluid handling swivel joint 100 that include a step (i.e., as shown in FIG. 4A) as well as embodiments that do not include a step (i.e., as shown in FIG. 7) are contemplated.

The assembly process of the embodiment of the fluid handling swivel joint 100 depicted in FIGS. 6 and 7 is similar to the assembly process described above, in regard to FIGS. 2-5.

Another embodiment of the fluid handling swivel joint 100 is depicted in FIGS. 8-11. In this embodiment, the fluid handling swivel joint 100 includes a first flanged portion 110 and a second flanged portion 131, both of which are coupled to a bearing module 128 that includes a body 130 and a tail portion 320. The first flanged portion 110 and the second flanged portion 131 are attached to the body 130 and tail portion 320, respectively, to form fluid tight seals with the bearing module 128. The first flanged portion 110 rotates relative to the second flanged portion 131 through rotation of the body 130 of the bearing module 128 relative to the tail portion 320 of the bearing module 128.

Figure 10:
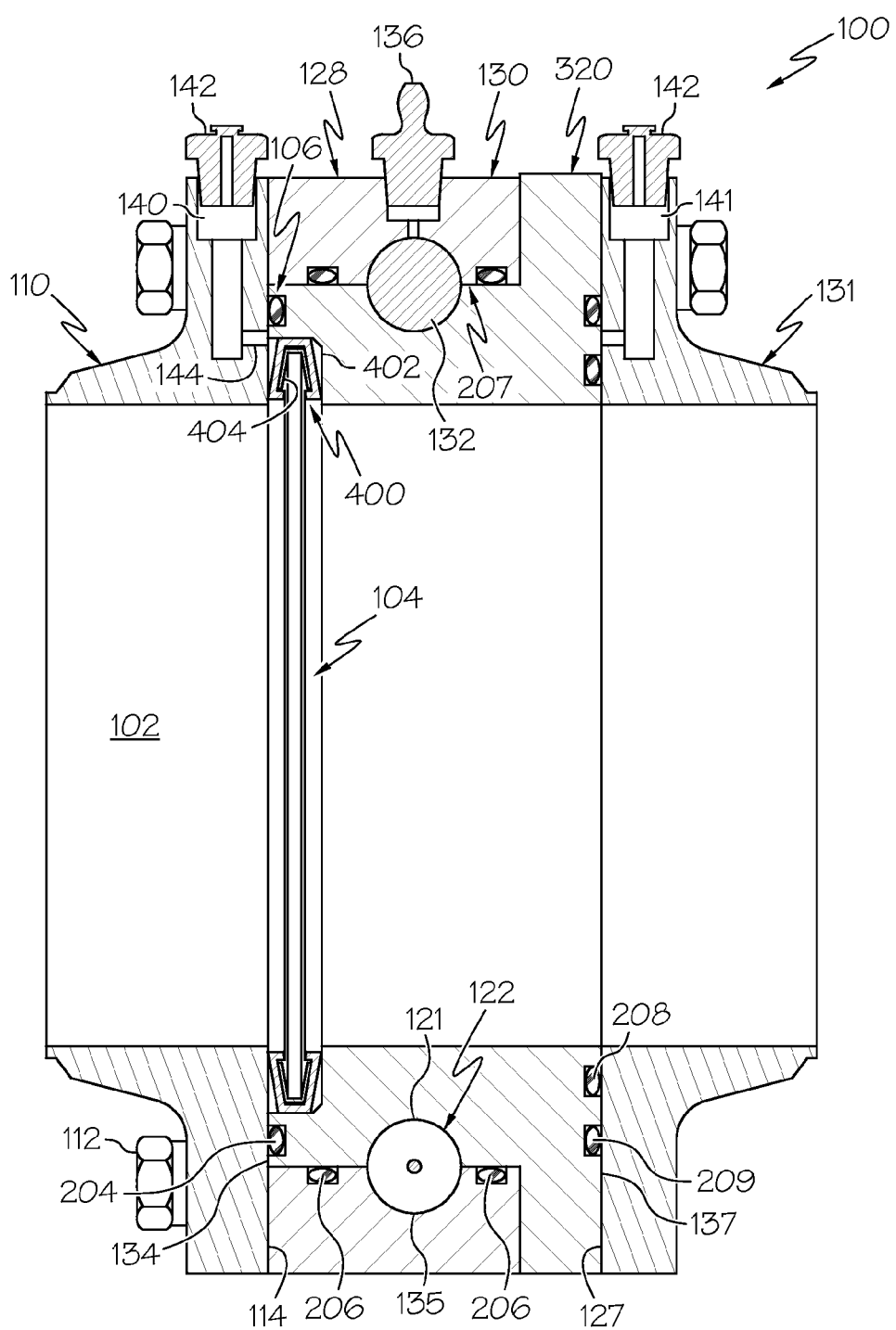
FIG. 10 depicts a schematic representation of a cross-section of a fluid handling swivel joint according to one or more embodiments shown and described herein.
Figure 11:
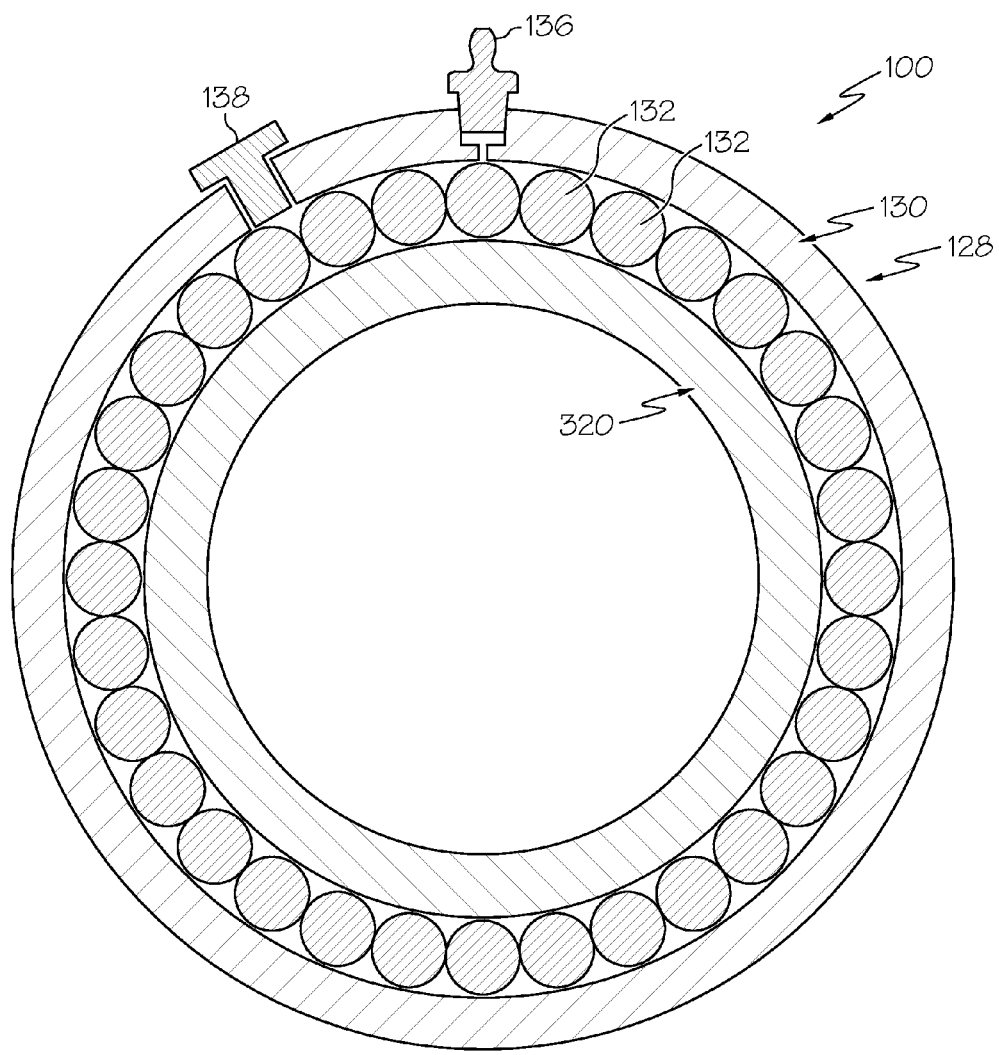
FIG. 11 depicts a schematic representation of a cross-section of a fluid handling swivel joint according to one or more embodiments shown and described herein.

As depicted in greater detail in FIGS. 10 and 11, the bearing module 128 of the fluid handling swivel joint 100 includes a body 130 and a tail portion 320. The interior-facing diameter of the body 130 includes a partial channel 135 and the exterior-facing diameter of the tail portion 320 includes a partial channel 121. When the partial channel 135 of the body 130 and the partial channel 121 of the tail portion 320 are aligned, the partial channels 135, 121 form a raceway 122 into which roller elements 132 are inserted. The body 130 rotates relative to the tail portion 320, and the roller elements 132 maintain the axial and concentric spacing between the two races.

The environmental seals 206 are disposed in glands formed in the inner diameter of the body 130. In this embodiment, two environmental seals 206 are fitted between the body 130 and the tail portion 320. Consistent with the embodiments discussed hereinabove, the environmental seals 206 prevent environmental debris from entering the raceway 122 created by the body 130 and the tail portion 320, and prevent lubricants from leaking from the raceway 122 into the surrounding environment.

As depicted in FIG. 10, the first flanged portion 110 is secured to the body 130 by a plurality of fasteners 112 and the second flanged portion 131 is secured to the tail portion 320 by a plurality of fasteners 112. The first flanged portion 110, the primary seal 104, here a spring energized seal 400, the tail portion 320, and the second flanged portion 131 form a conduit 102 along the interior of these components through which fluid passes. The primary seal 104 is positioned in an annular seat formed in the tail portion 320 such that the primary seal 104 creates a fluid tight seal between the first flanged portion 110 and the tail portion 320, which prevents fluids from leaking from the conduit 102 of the fluid handling swivel joint 100.

The fluid handling swivel joint 100 also includes a secondary seal 106, here a secondary O-ring 204, which creates a redundant seal between the first flanged portion 110 and the tail portion 320. The secondary seal 106 is located radially outwards from the primary seal 104. The secondary seal 106 is positioned in a gland formed in the tail portion 320 such that the secondary seal 106 seals a mating surface 114 of the first flanged portion 110 to a mating surface 134 of the tail portion 320. In the event that the sealing ability of the primary seal 104 is compromised, the secondary seal 106 continues to maintain a fluid-tight seal between the first flanged portion 110 and the tail portion 320, thereby preventing any fluid product from leaking out of the fluid handling swivel joint 100.

The fluid handling swivel joint 100 depicted in FIGS. 8-11 also includes a static sealed interface between the second flanged portion 131 and the tail portion 320. The static sealed interfaces include a primary static seal 208 and a secondary static seal 209 are assembled into the fluid handling swivel joint 100 such that both primary and secondary static seals 208, 209 form a fluid-tight seal between the tail portion 320 and the second flanged portion 131. The primary static seal 208 is located in a gland formed in the tail portion 320 such that the primary static seal 208 seals to a mating surface 137 of the tail portion 320 and to a mating surface 127 of the second flanged portion 131. The secondary static seal 209 is located radially outboard of the primary static seal 208 and is positioned in a gland formed in the tail portion 320 such that the secondary seal 209 seals to a mating surface 137 of the tail portion 320 and to a mating surface 127 of the second flanged portion 131. In the event that the sealing ability of the primary static seal 208 is compromised, the secondary static seal 209 will maintain a fluid-tight seal between the tail portion 320 and the second flanged portion 131, and will prevent fluid from leaking from the fluid handling swivel joint 100.

Because the bearing module 128 of this embodiment is coupled to both the first flanged portion 110 and the second flanged portion 131 by fasteners 112, the bearing module 128 may be disassembled from both the first flanged portion 110 and the second flanged portion 131. This may allow a fluid handling swivel joint 100 that is incorporated in the fluid conveyance equipment 90 (see FIG. 1) to be disassembled and the bearing module 128 to be removed for servicing of the roller elements 132, as well as servicing of the primary seal 104, the secondary seal 106, and the primary and secondary static O-rings 208, 209. While the embodiment of the fluid handling swivel joint 100 depicted in FIGS. 8-11 includes a spring energized seal 400, alternative embodiments of the fluid handling swivel joint 100 that include principal O-rings 500 (i.e., FIG. 4B) or a primary seal assembly 200 that includes an seal block 201 and two primary O-rings 202 (i.e., FIG. 4C) may be disassembled according to a similar procedure.

The embodiment of the fluid handling swivel joint 100 depicted in FIG. 10 includes two leak detection ports 140, 141. A first leak detection port 140 is located in the first flanged portion 110 and in fluid communication with the primary seal 104 and the secondary seal 106 by positioning the LEAK detection tap 144 between the primary seal 104 and the secondary seal 106. The second leak detection port 141 is located in the second flanged portion 131 and in fluid communication with the area between the primary static O-ring 208 and the secondary static O-ring 209. The leak detection ports 140, 141 provide a region for any fluid products that have leaked past the primary seal 104 or the primary static O-ring 208, respectively, to collect, which may allow for visual indication of seal failure without disassembly of the fluid handling swivel joint 100. The leak detection ports 140, 141 may be fitted with pressure relief fittings 142. Additionally, for end-user applications where any leakage of fluid product is undesirable, a gas that is inert to the fluid product may be introduced to the leak detection ports 140, 141 through a purge fitting. In the event of a compromised primary seal 104 or of a compromised primary static O-ring 208, the gas would flow past the primary seal 104 or the primary static O-ring 208, and into the flow of fluid product, thereby preventing any fluid product from entering the environment. Additionally, or in the alternative, a pressure sensor may be inserted into the leak detection ports 140, 141. The pressure sensor located in the second leak detection portion 141 may detect an increase in pressure that corresponds to fluid leaking past the primary static O-ring 208, which may indicate reduced sealing performance of the primary static O-ring 208. The pressure sensor may be in electronic communication with an electronic control unit, which may be in electronic communication with a pump used to transfer fluid products through the conduit 102. In cases where the pressure sensor measures an increase in pressure beyond the primary static O-ring 208, the pressure sensor may transmit a signal to the electronic control unit, which may command the pump to stop pumping.

The embodiments of the fluid handling swivel joint 100 depicted in FIGS. 8-11 may be assembled according to the following procedure. The bearing module 128 is assembled independently of the first flanged portion 110 and the second flanged portion 131. The environmental seals 206 are first installed into the body 130. The tail portion 320 is installed into the body 130 such that the partial channels 121, 135 are axially aligned to form the raceway 122. The roller elements 132 are inserted through the body 130 into the raceway 122 and retained in the raceway 122 by the plug 138. The nipple 136 and a pressure relief fitting (not shown) are installed into openings in the body 130 and lubricant may be introduced into the raceway 122 through the nipple 136. With the bearing module 128 assembled, the primary seal 104 is installed into the annular seat of the tail portion 320. The secondary seal 106 is installed into the tail portion 320. The first flanged portion 110 is aligned with and fastened to the body 130 by a plurality of fasteners 112. The primary and secondary static O-rings 208, 209 are installed into the tail portion 320. The second flanged portion 131 is aligned with and fastened to the tail portion 320 by a plurality of fasteners 112. A pressure relief fitting 142 is fitted to the first flanged portion 110 and the second flanged portion 131.

Figure 12:
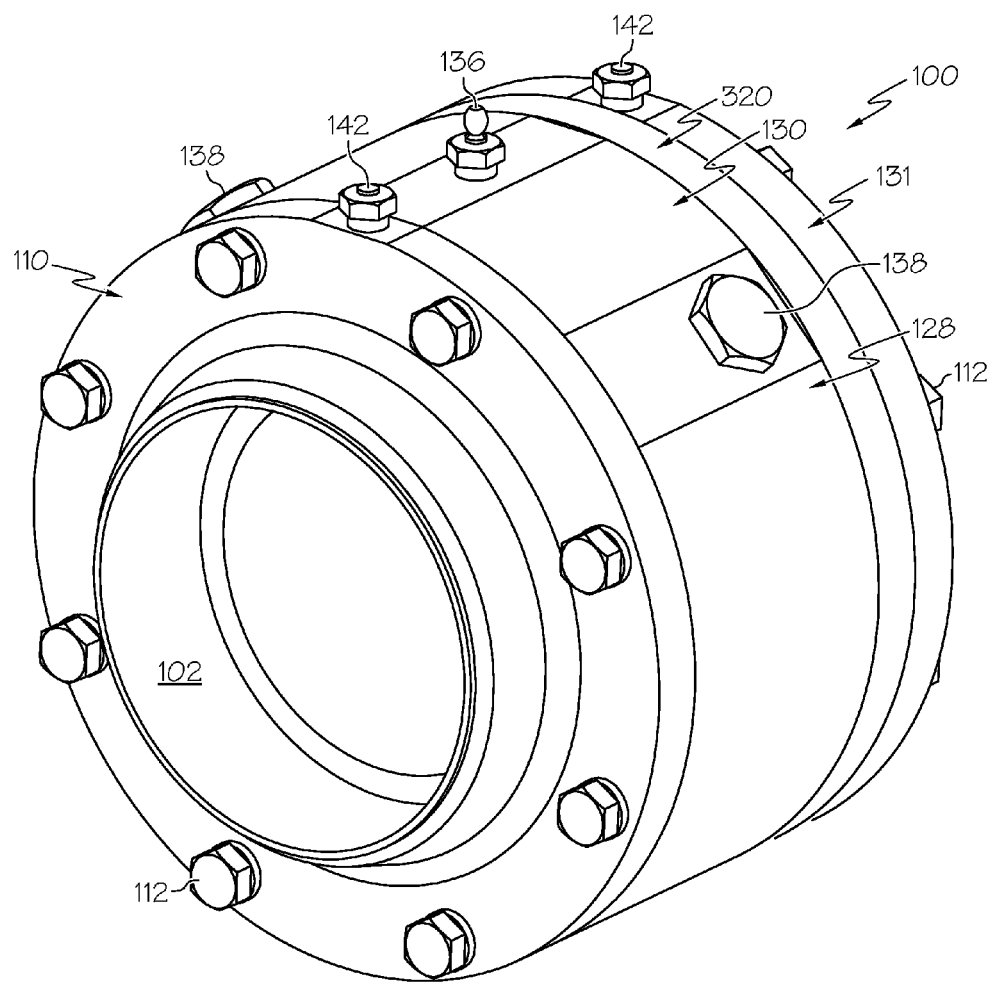
FIG. 12 depicts a schematic representation of a fluid handling swivel joint according to one or more embodiments shown and described herein.
Figure 13:
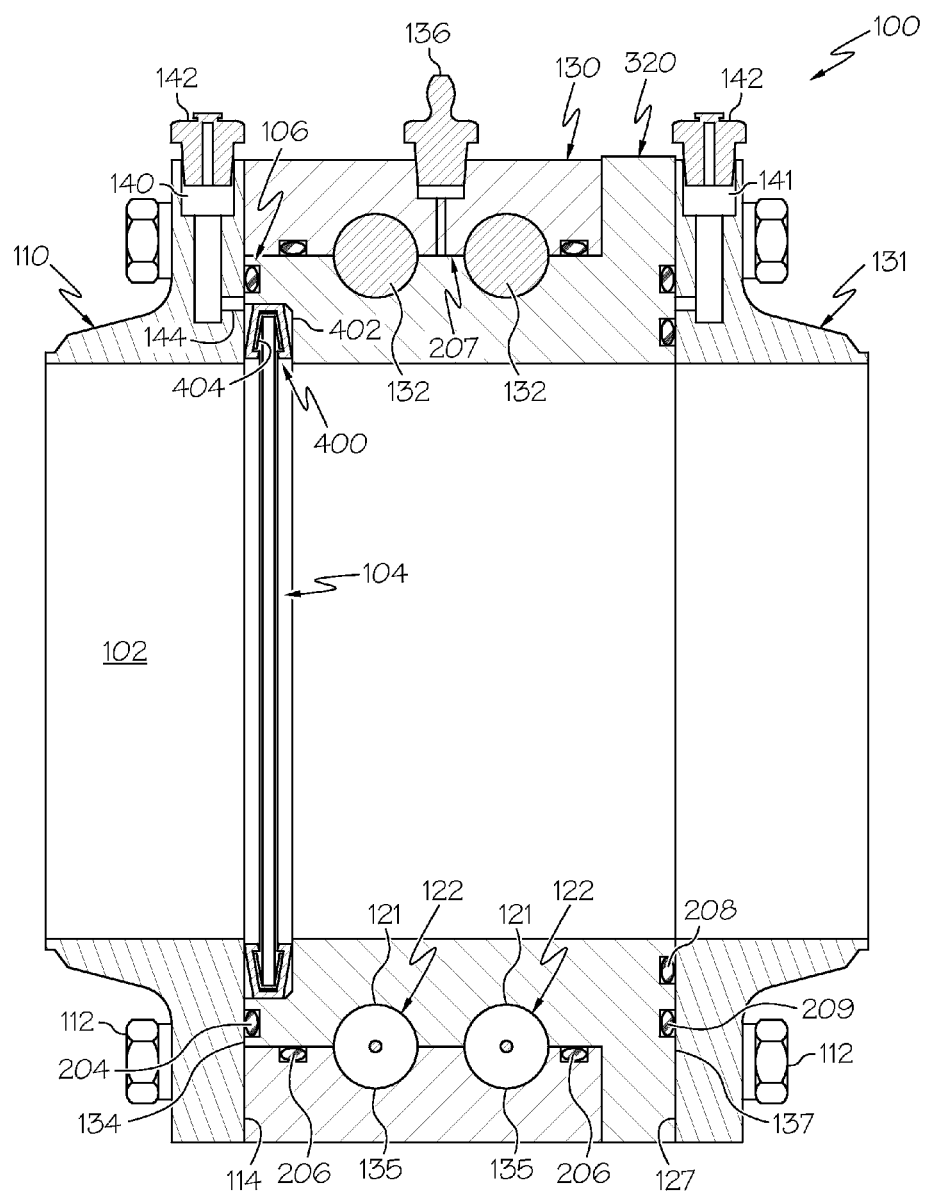
FIG. 13 depicts a schematic representation of a cross-section of a fluid handling swivel joint according to one or more embodiments shown and described herein.

Another embodiment of the fluid handling swivel joint 100 is depicted in FIGS. 12 and 13. In this embodiment, the fluid handling swivel joint 100 includes a first flanged portion 110, a second flanged portion 131, and a bearing module 128 as described above with respect to the embodiment of the fluid handling swivel joint 100 as depicted in FIGS. 8-11. However, in this embodiment, both the body 130 and the tail portion 320 of the bearing module 128 include two partial channels 121, 135. When the partial channels 121, 135 are aligned, the body 130 and the tail portion 320 form two raceways 122. Roller elements 132 are inserted into the two raceways 122 and retained in the raceways 122 by two plugs 138. By including two rows of roller elements 132, loads applied to the fluid handling swivel joint 100 can be distributed along a greater area than a single row of roller elements 132, which may allow the fluid handling swivel joint 100 to be used in conjunction with increased loads. This may be important as the length, and therefore the weight, of the fluid conveyance equipment 90 (see FIG. 1), and the fluid products that it conveys, increases. Additionally, by including two rows of roller elements 132, the fluid handling swivel joint 100 may be able to resist increased moment loads applied to the fluid conveyance equipment 90 in which the fluid handling swivel joint 100 is incorporated.

The assembly process of the embodiment of the fluid handling swivel joint 100 depicted in FIGS. 12 and 13 is similar to the assembly process described above, in regard to FIGS. 8-11.

Figure 14:
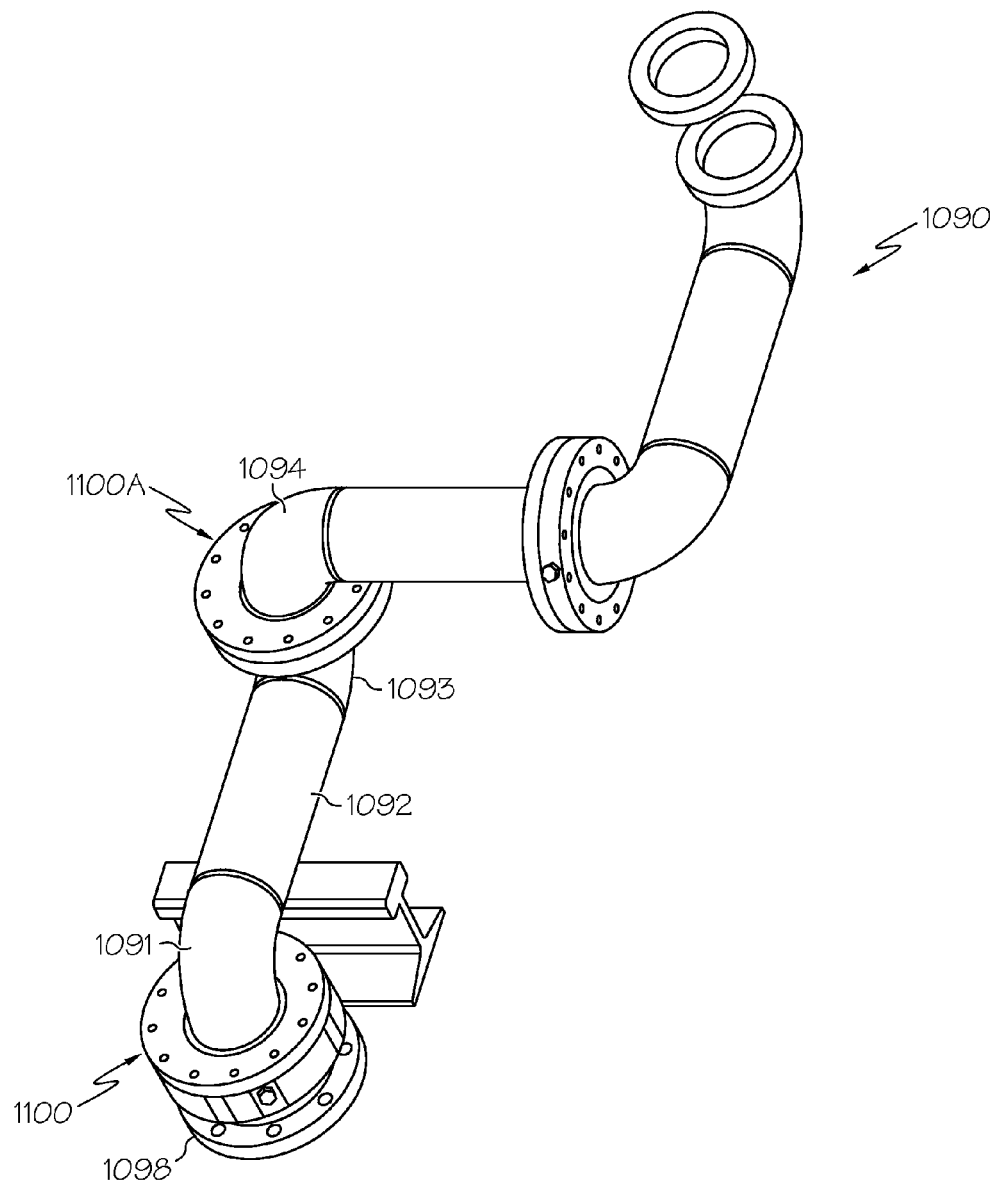
FIG. 14 depicts a schematic representation of fluid conveyance equipment according to one or more embodiments shown and described herein.

Referring to FIG. 14, an embodiment of fluid conveyance equipment 1090, including fluid handling swivel joints 1100, is depicted. The fluid handling swivel joints 1100 are "low profile" joints that permit the fluid conveyance equipment 1090 to be installed into low-clearance end-user applications. In the embodiment depicted in FIG. 14, a first fluid handling swivel joint 1100 is attached to a standpipe 1098 that extends vertically from the ground and a first fluid handling elbow 1091. The first fluid handling elbow 1091 is attached to a length of straight pipe 1092, which is attached to a second fluid handling elbow 1093. A second fluid handling swivel joint 1100A is attached to both the second fluid handling elbow 1093 and a third fluid handling elbow 1094. As is further depicted in FIG. 14, additional fluid handling components, including additional fluid handling swivels and additional fluid handling pipes, may be assembled to form the desired fluid conveyance equipment 1090 having appropriate size for the intended application. The first fluid handling swivel joint 1100 allows the first fluid handling elbow 1091 to rotate relative to the standpipe 1098 while maintaining a fluid-tight seal that prevents fluid product from leaking from the fluid conveyance equipment 1090 into the environment. The second fluid handling swivel joint 1100A allows the third fluid handling elbow 1094 to rotate relative to the second fluid handling elbow 1093 while maintaining a fluid-tight seal that prevents fluid product from leaking from the fluid conveyance equipment 1090 into the environment.

Figure 15:
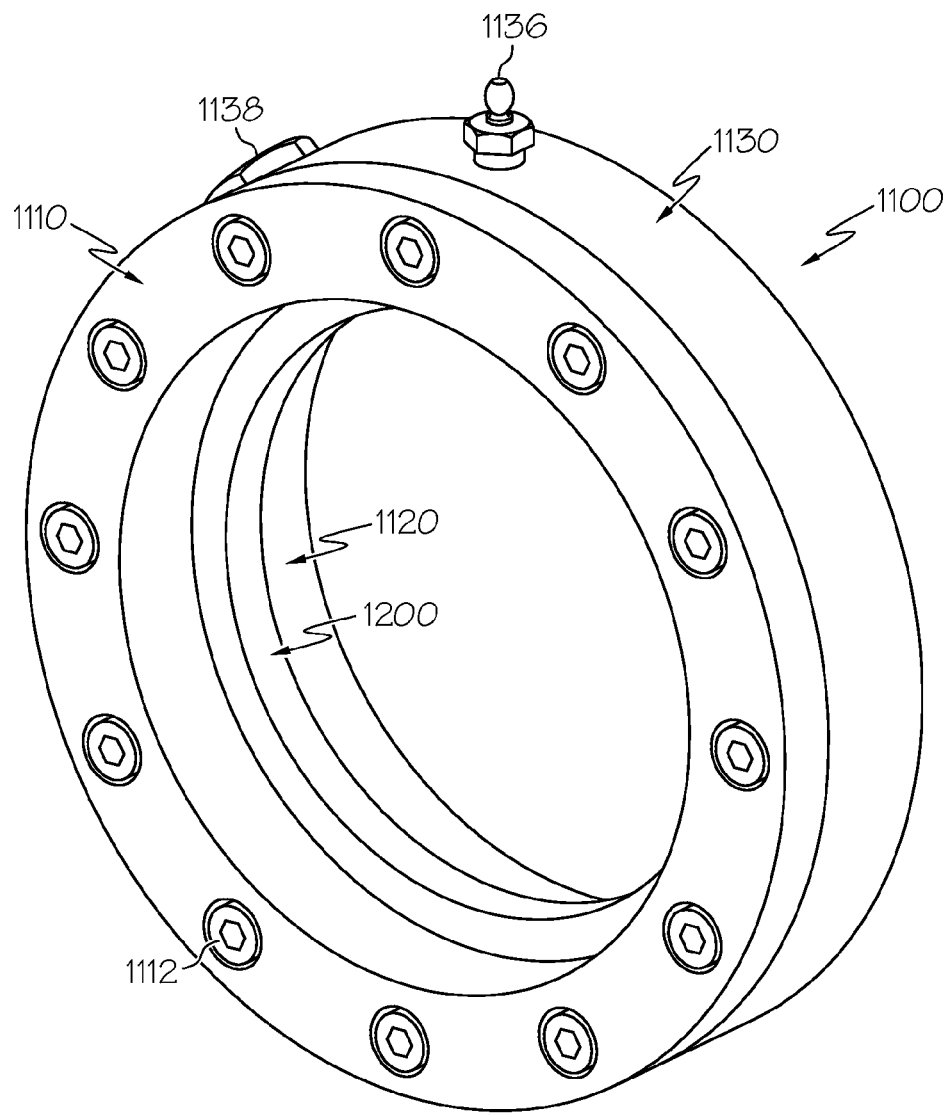
FIG. 15 depicts a schematic representation of a fluid handling swivel joint according to one or more embodiments shown and described herein.
Figure 16:
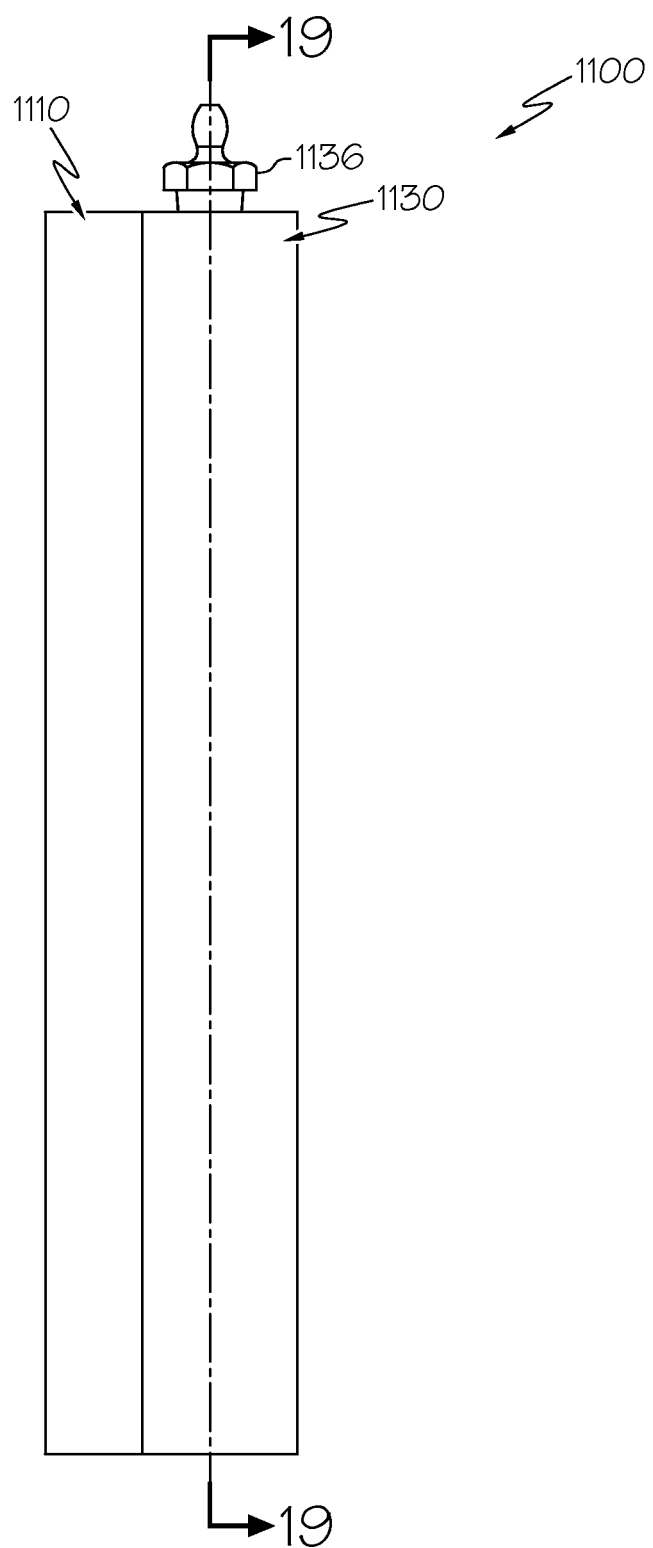
FIG. 16 depicts a schematic representation of a fluid handling swivel joint according to one or more embodiments shown and described herein.

Referring now to FIGS. 15 and 16, the fluid handling swivel joint 1100 includes a flanged portion 1110 that may be coupled to a first fluid handling pipe (i.e., the third fluid handling elbow 1094 of FIG. 14) and a tail portion 1120 that may be coupled to a second fluid handling pipe (i.e., the second fluid handling elbow 1093 of FIG. 14). The tail portion 1120 is at least partially surrounded by a body 1130. As depicted, the body 1130 is fastened to the flanged portion 1110 by a plurality of fasteners 1112.

Figure 17A:
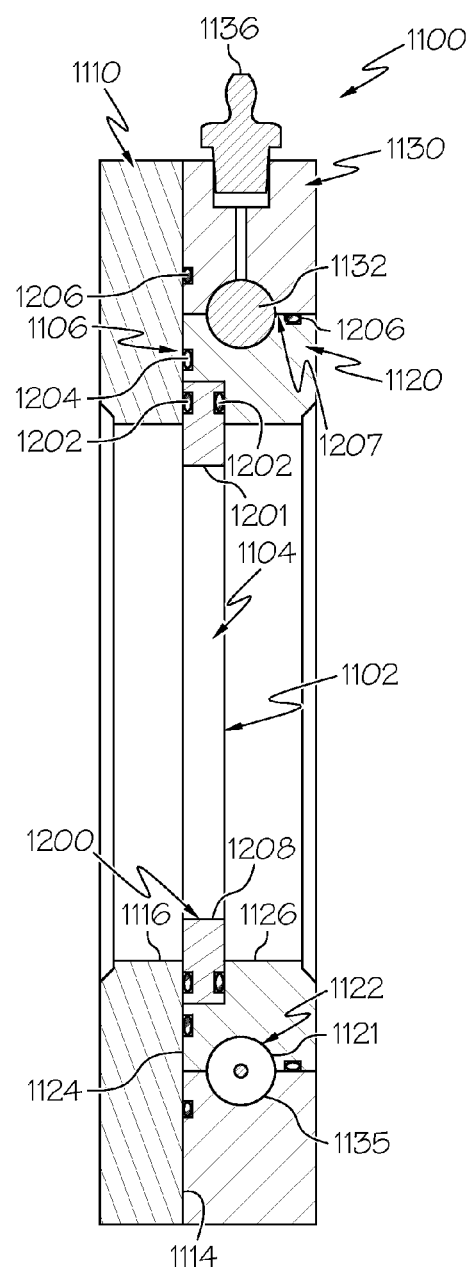
FIG. 17A depicts a schematic representation of a cross-section of a fluid handling swivel joint according to one or more embodiments shown and described herein.

As further depicted in FIG. 17A, the body 1130 of this embodiment includes a partial channel 1135 that is formed in an interior-facing diameter of the body 1130. The tail portion 1120 includes a partial channel 1121 that is located on an exterior-facing diameter of the tail portion 1120. When the body 1130 is assembled over the tail portion 1120 and positioned in the axial direction, the partial channel 1121 on the tail portion 1120 and the channel 1135 on the body 1130 align to form a raceway 1122 having a generally toroidal shape.

Figure 17B:
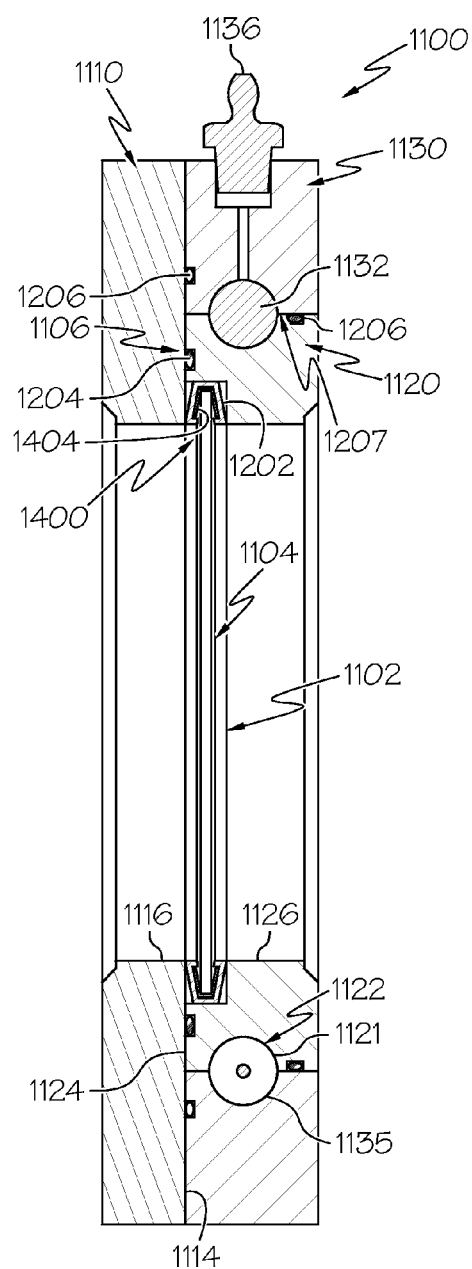
FIG. 17B depicts a schematic representation of a cross-section of a fluid handling swivel joint according to one or more embodiments shown and described herein.
Figures 17C, 18:
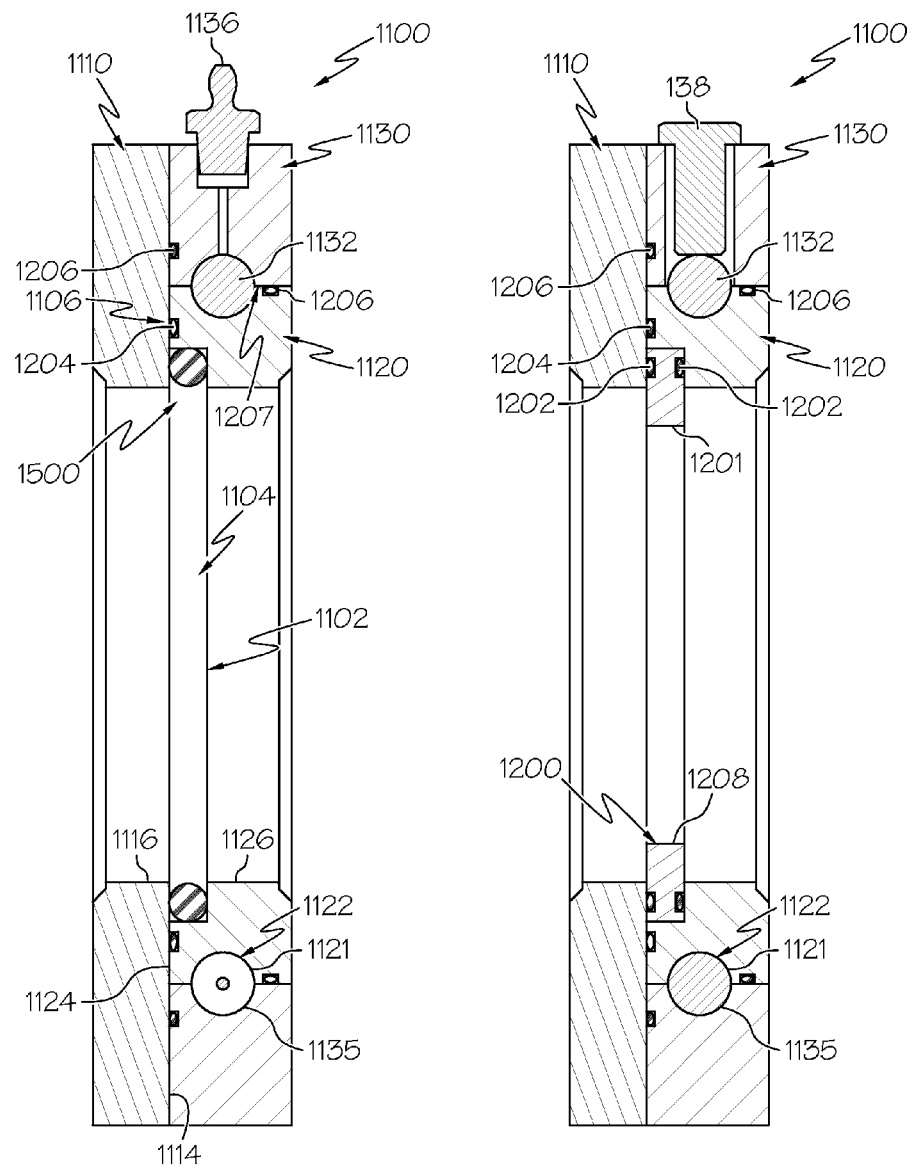
FIG. 17C depicts a schematic representation of a cross-section of a fluid handling swivel joint according to one or more embodiments shown and described herein.
FIG. 18 depicts a schematic representation of a cross-section of a fluid handling swivel joint according to one or more embodiments shown and described herein.

Referring to FIGS. 17A and 18, a plurality of roller elements 1132 are inserted into the raceway 1122 formed by the body 1130 and the tail portion 1120. The roller elements 1132 align the body 1130 axially and radially relative to the tail portion 1120 based on the contact between the roller elements 1132 and the partial channel 1121 on the tail portion 1120 and the partial channel 1135 on the body 1130. The roller elements 1132 allow the body 1130, and the flanged portion 1110, which is coupled to the body 1130, to rotate relative to the tail portion 1120. The roller elements 1132 maintain the concentric spacing of the body 1130 relative to the tail portion 1120, thereby minimizing any contact between the exterior-facing diameter of the tail portion 1120 and the interior-facing diameter of the body 1130. The roller elements 1132 also maintain the axial spacing of the body 1130 relative to the tail portion 1120, which, therefore, maintains the axial position of the flanged portion 1110 relative to the tail portion 1120, thereby controlling any relative translational movement between the tail portion 1120 and the flanged portion 1110. The roller elements 1132 are inserted into the raceway 1122 through a raceway port, which is capped and sealed with a plug 1138. The plug 1138 prevents the roller elements 1132 from being displaced from the raceway 1122 during normal operation. Additionally, the plug 1138 allows access to the roller elements 1132 for removal during servicing.

A nipple 1136 may be positioned in the body 1130 such that the nipple 1136 is in fluid communication with the raceway 1122 and the roller elements 1132. Lubricant, for example grease, may be introduced to the raceway 1122 and the roller elements 1132 through the nipple 1136 without requiring disassembly of the plug 1138 from the body 1130, or requiring disassembly of the body 1130 from the tail portion 1120.

As further depicted in FIG. 17A, the fluid handling swivel joint 1100 further includes a series of seals that are arranged between adjacent components of the fluid handling swivel joint 1100. The fluid handling swivel joint 1100 includes a primary seal 1104. In the embodiment depicted in FIG. 17A, the primary seal 1104 is a primary seal assembly 1200 that includes an seal block 1201 having an "H"-shaped cross-section formed by two O-ring glands that are located in opposite faces of the seal block 1201. Two primary O-rings 1202 are inserted into the O-ring glands that are formed in the seal block 1201. The primary seal assembly 1200 is positioned in an annular seat formed in the tail portion 1120 such that the first primary O-ring 1202 contacts the flanged portion 1110 while the second primary O-ring 1202 contacts the tail portion 1120. As depicted, the interior-facing diameter 1208 of the seal block 1201 is smaller than the interior openings 1116, 1126 of the flanged portion 1110 and the tail portion 1120, such that the seal block 1201 extends inwardly from the interior openings 1116, 1126 when the seal assembly 1200 is assembled between the flanged portion 1110 and the tail portion 1120.

Figure 24A:
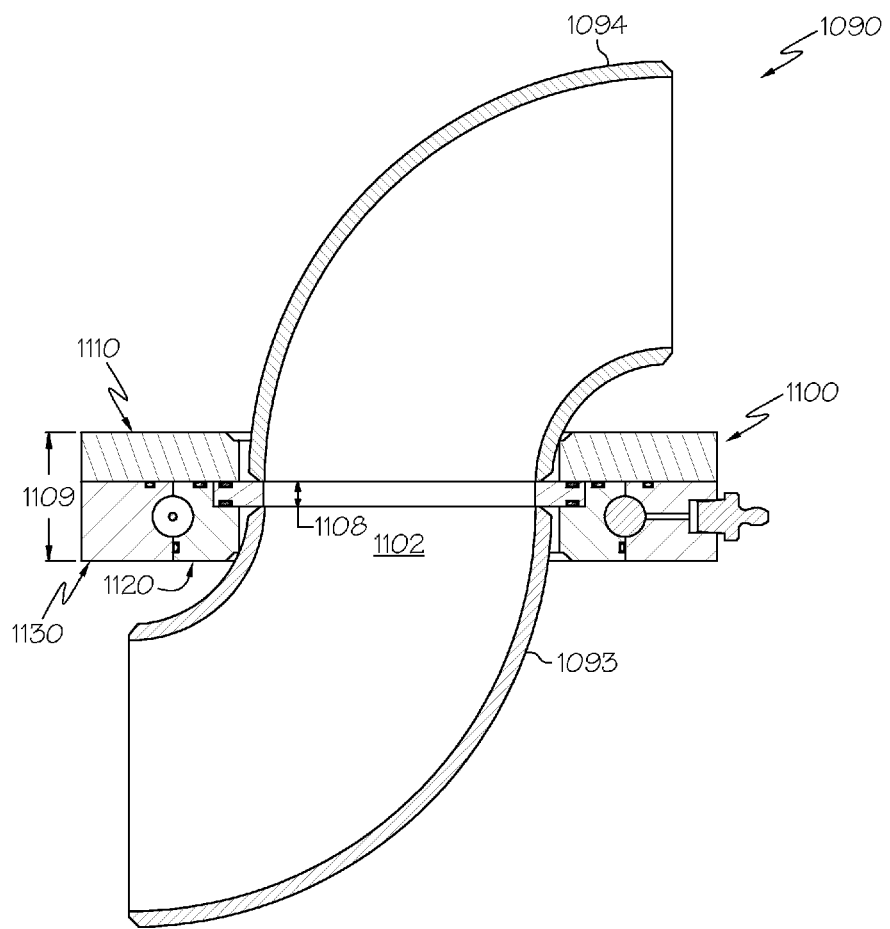
FIG. 24A depicts a schematic representation of a cross-section of fluid conveyance equipment according to one or more embodiments shown and described herein.

Referring now to FIG. 24A, a first fluid handling line (i.e., the second fluid handling elbow 1093) and a second fluid handling line (i.e., the third fluid handling elbow 1094) are inserted into the interior openings 1116, 1126 of the flanged portion 1110 and the tail portion 1120, respectively. The fluid handling lines are secured and sealed to the flanged portion 1110 or the tail portion 1120. The internal diameter of the second fluid handling elbow 1093, the internal diameter of the third fluid handling elbow 1094, and the interior-facing diameter 1208 of the seal block 1201 form a conduit 1102 that fluid products pass through. The primary O-rings 1202, therefore, prevent fluid from escaping from the conduit 1102 into the environment by forming a fluid-tight seal between the flanged portion 1110 and the tail portion 1120.

Referring again to FIG. 17A, the fluid handling swivel joint 1100 also includes a secondary seal 1106, here a secondary O-ring 1204, which creates a redundant seal between the flanged portion 1110 and the tail portion 1120. The secondary seal 1106 is located radially outboard of the primary seal 1104. The secondary seal 1106 is positioned in a gland formed in the tail portion 1120 such that the secondary seal 1106 seals to a mating surface 1114 of the flanged portion 1110 and to a mating surface 1124 of the tail portion 1120. In the event that the sealing ability of the primary seal 1104 is compromised, the secondary seal 1106 continues to maintain a fluid-tight seal between the flanged portion 1110 and the tail portion 1120, thereby preventing any fluid product from leaking out of the fluid handling swivel joint 1100.

The fluid handling swivel joint 1100 also includes two environmental seals 1206. As depicted in FIG. 17A, a first environmental seal 1206 is positioned in a gland formed in an external-facing diameter of the tail portion 1120 such that the first environmental seal 1206 seals between the tail portion 1120 and the body 1130. A second environmental seal 1206 is positioned in a gland formed in the body 1130 at a location radially outboard from the tail portion 1120. The second environmental seal 1206 seals between the flanged portion 1110 and the body 1130. Together, the first and second environmental seals 1206 create an isolated volume 1207 that is a sealed envelope that surrounds the raceway 1122. The environmental seals 1206 prevent environmental debris such as water and dust from entering the raceway 1122 and/or the conduit 1102 formed by the second fluid handling elbow 1093, the third fluid handling elbow 1094, and the seal block 1201. If this environmental debris were permitted to enter the raceway 1122, the life and operation of the roller elements 1132 within the raceway 1122 may be reduced. Additionally, the environmental seals 1206 may prevent any lubricant in the raceway 1122 (i.e., introduced through the nipple 1136) from being introduced into the environment. A pressure relief fitting (not shown) installed into the body 1130 and in fluid communication with the raceway 1122 may allow excess pressure that builds in the raceway 1122 to be relieved. If the fluid product being conveyed through the fluid handling swivel joint 1100 is at an elevated temperature, for example heated asphalt, the fluid product may heat the lubricant in the raceway 1122. Heating the lubricant may lead to expansion of the lubricant and/or outgassing of the lubricant, which would increase the pressure within the raceway 1122. If not relieved, this increase in pressure may cause the environmental seals 1206 to distort or to be displaced from their glands, thereby thereby allowing release of lubricant from the isolated volume 1207 or allowing introduction of contaminants to the isolated volume 1207.

In the embodiment of the fluid handling swivel joint 1100 depicted in FIGS. 15-17A, the seal block 1201 is made from a polymer material, such as polytetrafluoroethylene (PTFE). PTFE is generally inert with respect to fluid chemicals that are typically passed through the fluid handling swivel joint 1100. Examples of such fluid products that are carried through fluid handling equipment include liquid hydrocarbons, liquid petroleum products, petrochemicals, water, solvents, liquid food products, alcohol, fertilizers, acids, waste solids, dissolved solids, and combinations thereof. The fluid products may also include solids that are capable of flowing through a length of pipe, including, without limitation, pelletized fertilizers, process and unprocessed grains, and cement. The products carried through the fluid conveyance equipment 1090 may include liquids, solids, gases, or combinations thereof. Additionally, PTFE has a lower coefficient of friction than carbon steel or stainless steel, from which the flanged portion 1110 and the tail portion 1120 are constructed. Because the primary O-rings 1202 abut both the lower coefficient of friction seal block 1201 and the higher coefficient of friction flanged portion 1110 and the tail portion 1120, when the flanged portion 1110 rotates relative to the tail portion 1120, the primary O-rings 1202 have a tendency to move (i.e., slide) relative to the seal block 1201 while maintaining their positions (i.e., stick) relative to the flanged portion 1110 or tail portion 1120, respectively. By encouraging the primary O-rings 1202 to rotate relative to the low-friction seal block 1201, the force required to rotate the flanged portion 1110 relative to the tail portion 1120 is reduced as compared to a fluid handling swivel joint 1100 that does not include a seal block 1201 made from a low-friction material. Additionally, primary O-rings 1202 that abut a low-friction material, such as a PTFE seal block 201, may have increased life as compared to O-rings that do not abut low-friction material, because the reduction in friction of the low-friction seal block 1201 decreases the mechanism that typically causes wear in dynamic O-rings, such as the primary O-rings 1202.

In another embodiment of the fluid handling swivel joint 1100, a leak detection port (not shown but similar to the leak detection portion 140 discussed in regard to FIG. 4A) may be included in the flanged portion 1110, such that the leak detection port is in fluid communication with the primary seal assembly 1200 and the secondary O-ring 1204. A pressure sensor (not shown) may be added to the leak detection port in the flanged portion 1110, such that the pressure sensor is in fluid communication with the primary seal assembly 1200 and the secondary O-ring 1204. The pressure sensor may be able to detect an increase in pressure in the fluid cavity between the primary seal assembly 1200 and the secondary O-ring 1204. The increased pressure may correspond with fluid products leaking past the primary seal assembly 1200, which may indicate compromised sealing performance of one or more of the primary O-rings 1202. The pressure sensor may be in electronic communication with an electronic control unit, which may be in electronic communication with a pump used to transfer fluid products through the conduit 102. In cases where the pressure sensor measures an increase in pressure beyond the primary seal assembly 1200, the pressure sensor may transmit a signal to the electronic control unit, which may command the pump to stop pumping.

Another embodiment of the fluid handling swivel joint 1100 is depicted in FIG. 17B. This embodiment is similar to the embodiment described above in regard to FIGS. 15-17A, but the primary seal 1104 is a spring energized seal 1400 that includes a jacket 1402 and a spring 1404. The spring energized seal 1400 is positioned in an annular seat formed in the tail portion 1120 such that a portion of the jacket 1402 contacts the first flanged portion 1110 while a portion of the jacket 1402 contacts the tail portion 1120. In an unrestrained state, a maximum side-to-side thickness dimension of the spring energized seal 1400 may be greater than a distance of the annular seat formed in the tail portion 1120. Thus, when the spring energized seal 1400 is installed into the annular seat, the first flanged portion 1110 and the tail portion 1120 compress the jacket 1402 and the spring 1404 of the spring energized seal 1400. The jacket 1402, therefore, prevents fluid product from escaping from the conduit 1102 through which fluid product flows into the environment by forming a fluid-tight seal between the first flanged portion 1110 and the tail portion 1120. In addition, for certain applications where the fluid product flowing through the conduit 1102 is at an elevated pressure, the pressure of the fluid tends to apply a force to the spring energized seal 1400 in a direction corresponds to opening the jacket 1402 into the first flanged portion 1110 and the tail portion 1120. The pressure of the fluid product, therefore, may increase the sealing force between the jacket 1402 and the annular seat.

Figure 24B:
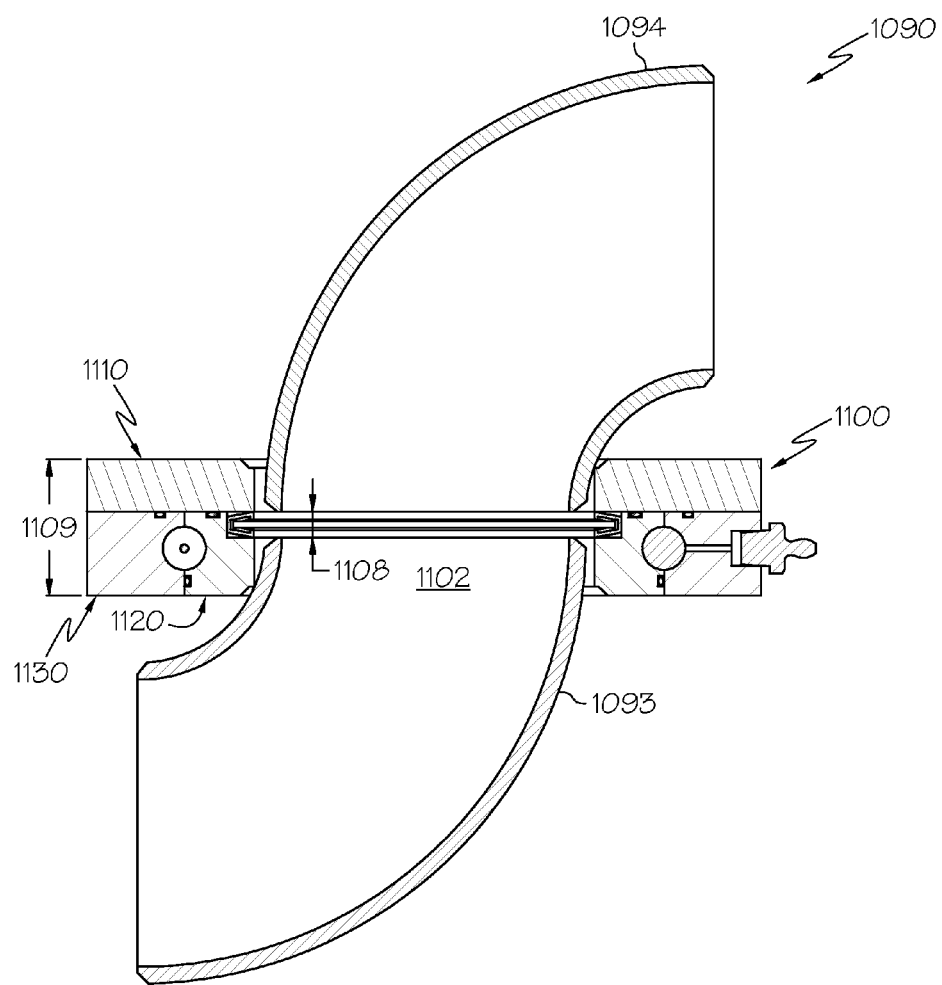
FIG. 24B depicts a schematic representation of a cross-section of fluid conveyance equipment according to one or more embodiments shown and described herein.

Referring now to FIG. 24B, a first fluid handling line (i.e., the second fluid handling elbow 1093) and a second fluid handling line (i.e., the third fluid handling elbow 1094) are inserted into the interior openings 1116, 1126 of the flanged portion 1110 and the tail portion 1120, respectively. The fluid handling lines are secured and sealed to the flanged portion 1110 or the tail portion 1120. The internal diameter of the second fluid handling elbow 1093 and the internal diameter of the third fluid handling elbow 1094 form a conduit 1102 that fluid products pass through. The spring energized seal 1400, therefore, prevents fluid from escaping from the conduit 1102 into the environment by forming a fluid-tight seal between the flanged portion 1110 and the tail portion 1120.

Another embodiment of the fluid handling swivel joint 1100 is depicted in FIG. 17C. This embodiment is similar to the embodiment described above in regard to FIGS. 15-17A, but the primary seal 1104 is a principal O-ring 1500. The principal O-ring 1500 forms a seal between the faces of the annular seat formed in the tail portion 1120 and the first flanged portion 1110. The principal O-ring 1500 prevents fluid from escaping from the conduit 1102 into the environment by forming a fluid-tight seal between the first flanged portion 1110 and the tail portion 1120. Other cross-sectional shapes of principal O-rings 500, including square and X-shaped, are contemplated.

Figure 19A:
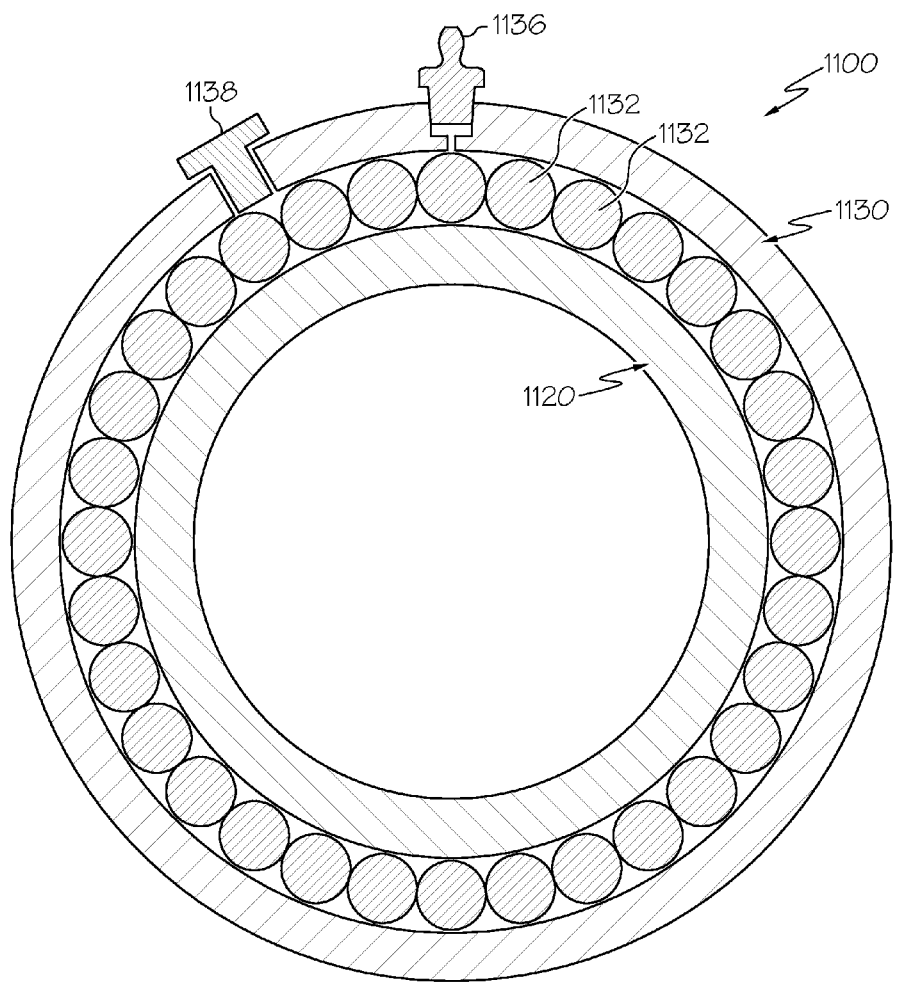
FIG. 19A depicts a schematic representation of a cross-section of a fluid handling swivel joint according to one or more embodiments shown and described herein.
Figure 19B:
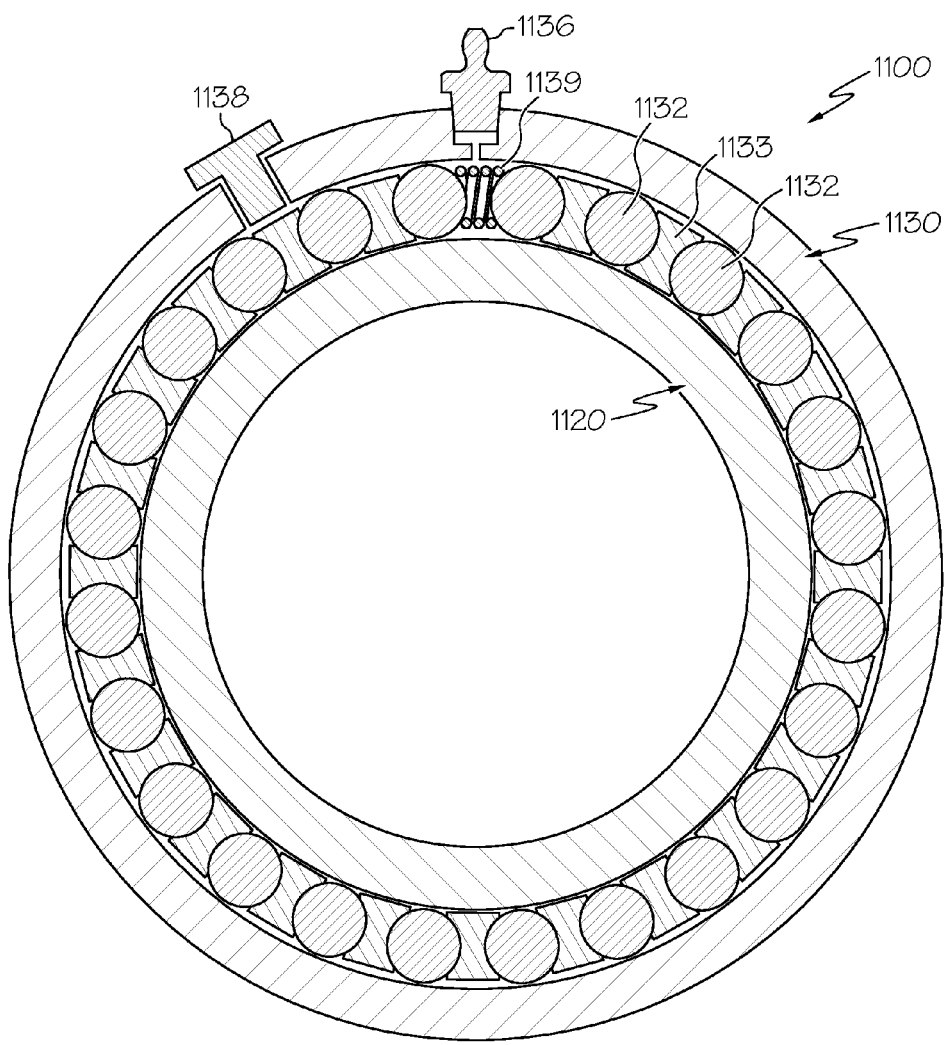
FIG. 19B depicts a schematic representation of a cross-section of a fluid handling swivel joint according to one or more embodiments shown and described herein.

Referring now to FIGS. 18 and 19A, because the roller elements 1132 are inserted in to the raceway 1122 after the tail portion 1120 and the body 1130 have been assembled, a cage need not be included to maintain the spacing between the roller elements 1132. Instead, the roller elements 1132 of the fluid handing swivel joints 1100 maintain their spacing by direct contact with one another. As depicted in FIG. 19A, the partial channel 1121 of the tail portion 1120 and the partial channel 1135 of the body 1130 may be formed such that the roller elements 1132 fit within the raceway 1122 without a need for additional support. In another embodiment depicted in FIG. 19B, a plurality of spacers 1133 may be inserted in to the raceway 1122 between adjacent roller elements 1132. Additionally, a spring 1139 may be inserted between two roller elements 1132 to maintain contact between adjacent roller elements 1132 and spacers 1133. The spring 1139 exerts a force to the adjacent roller elements 1132 in a circumferential direction. The force applied to the roller elements 1132 by the spring 1139 is sufficient to bias adjacent roller elements 1132 and spacers 1133 to remain in contact with one another as the body 1130 rotates relative to the tail portion 1120.

Figure 20:
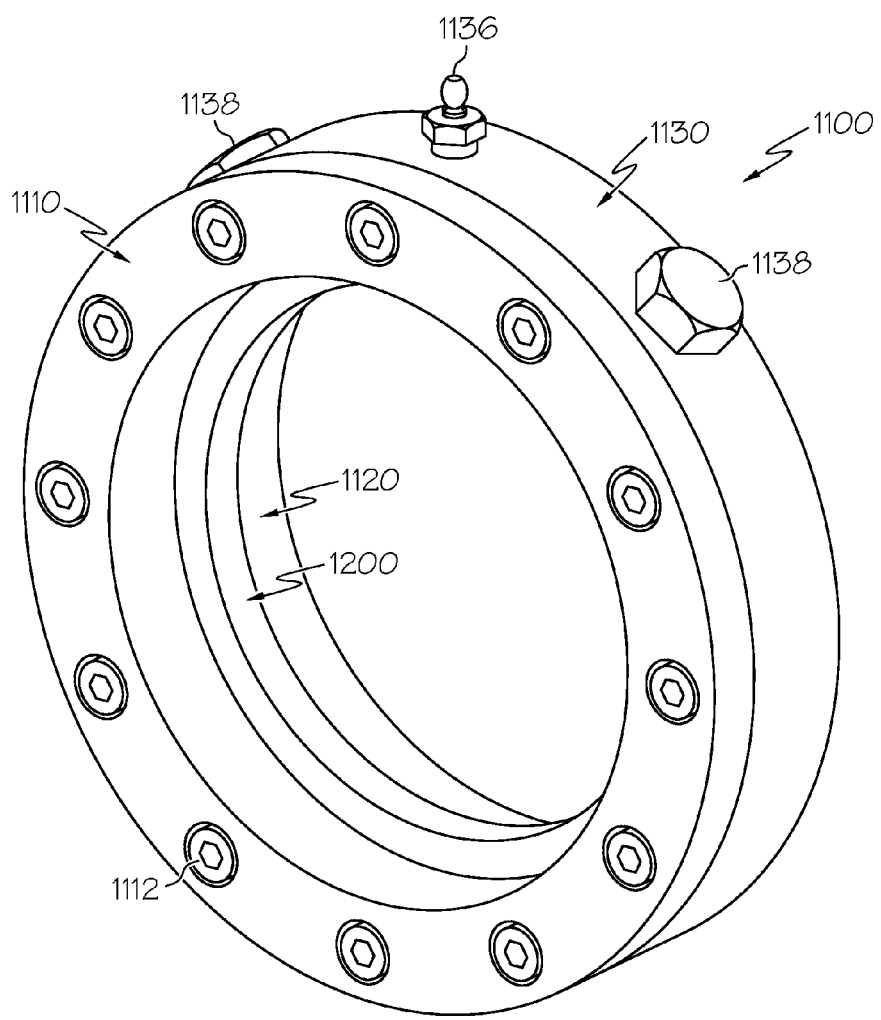
FIG. 20 depicts a schematic representation of a fluid handling swivel joint according to one or more embodiments shown and described herein.
Figure 21A:
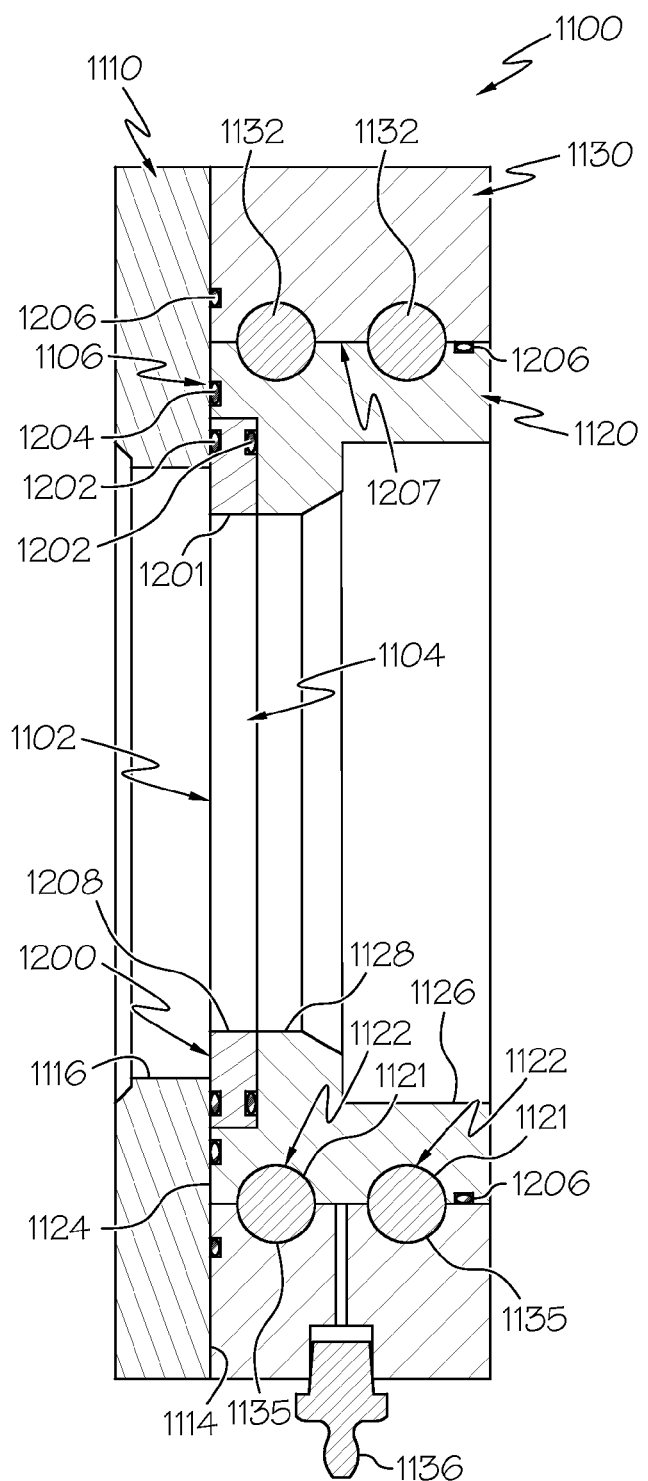
FIG. 21A depicts a schematic representation of a cross-section of a fluid handling swivel joint according to one or more embodiments shown and described herein.

Another embodiment of the fluid handling swivel joint 1100 is depicted in FIGS. 20 and 21A. This embodiment is similar to the fluid handling swivel joint 1100 described in regard to FIGS. 15-17A, however, in this embodiment, both the body 1130 and the tail portion 1120 include two partial channels 1121, 1135. When the two partial channels 1121, 1135 are aligned, the body 1130 and the tail portion 1120 form two raceways 1122. Roller elements 1132 are inserted into the two raceways 1122 and retained in the raceways 1122 by two plugs 1138. By including two rows of roller elements 1132, loads applied to the fluid handling swivel joint 1100 can be distributed along a greater area than a single row of roller elements 1132, which may allow the fluid handling swivel joint 1100 to be used in conjunction with increased applied loads. This may be important as the length, and therefore the weight, of the fluid conveyance equipment 1090 (see FIG. 14) increases, along with a corresponding increase in the volume of the fluid products that is convey. Additionally, by including two rows of roller elements 1132, the fluid handling swivel joint 1100 may be able to resist increased moment loads applied to the fluid conveyance equipment 1090 that the fluid handling swivel joint 1100 is incorporated in.

As depicted in FIG. 21A, the environmental seals 1206 that surround the raceways 1122 are positioned such that the environmental seals 1206 surround both sets of roller elements 1132. A first environmental seal 1206 is positioned in a gland formed in an external-facing diameter of the tail portion 1120 such that the first environmental seal 1206 seals between the tail portion 1120 and the body 1130. A second environmental seal 1206 is positioned in a gland formed in the body 1130 at a location radially outboard from the tail portion 1120. The second environmental seal 1206 seals between the flanged portion 1110 and the body 1130. Together, the first and second environmental seals 1206 create the isolated volume 1207 that surrounds the raceway 1122. The environmental seals 1206 prevent environmental debris such as water and dust from entering the raceway 1122 and/or the conduit 1102 formed by the first fluid handling elbow 1091, the seal block 1201, the tail portion 1120, and the standpipe 1098 (see FIG. 23). If this environmental debris were permitted to enter the raceway 1122, the life and operation of the roller elements 1132 within the raceway 1122 may be reduced. Additionally, the nipple 1136 is positioned inside the body 1130 and configured such that lubricant introduced through the nipple 1136 enters both raceways 1122 to lubricate both sets of roller elements 1132. The environmental seals 1206 may prevent any lubricant that is introduced to the raceway 1122 (i.e., through the nipple 1136) from being introduced into the environment.

As further depicted in FIG. 21A, the interior region of the tail portion 1120 includes an interior opening 1126 as well as a second interior-facing diameter 1128 that is smaller than the diameter of the interior opening 1126. The annular seat into which the seal assembly 1200 is inserted is formed adjacent to the interior-facing diameter 1128. When the fluid handling swivel joint 1100 is assembled, the second primary O-ring 1202 abuts the tail portion 1120. The interior-facing diameter 1208 of the seal block 1201 is concentric with the interior-facing diameter 1128 of the tail portion 1120. The interior-facing diameter 1208 of the seal block 1201 and the interior-facing diameter 1128 of the tail portion 1120 form part of the conduit 1102 through which fluid products flow. The interior-facing diameter 1208 of the seal block 1201 and the interior-facing diameter 1128 of the tail portion 1120 may have similar diameters to minimize disruptions to the flow of fluid products through the conduit 1102.

Figure 21B:
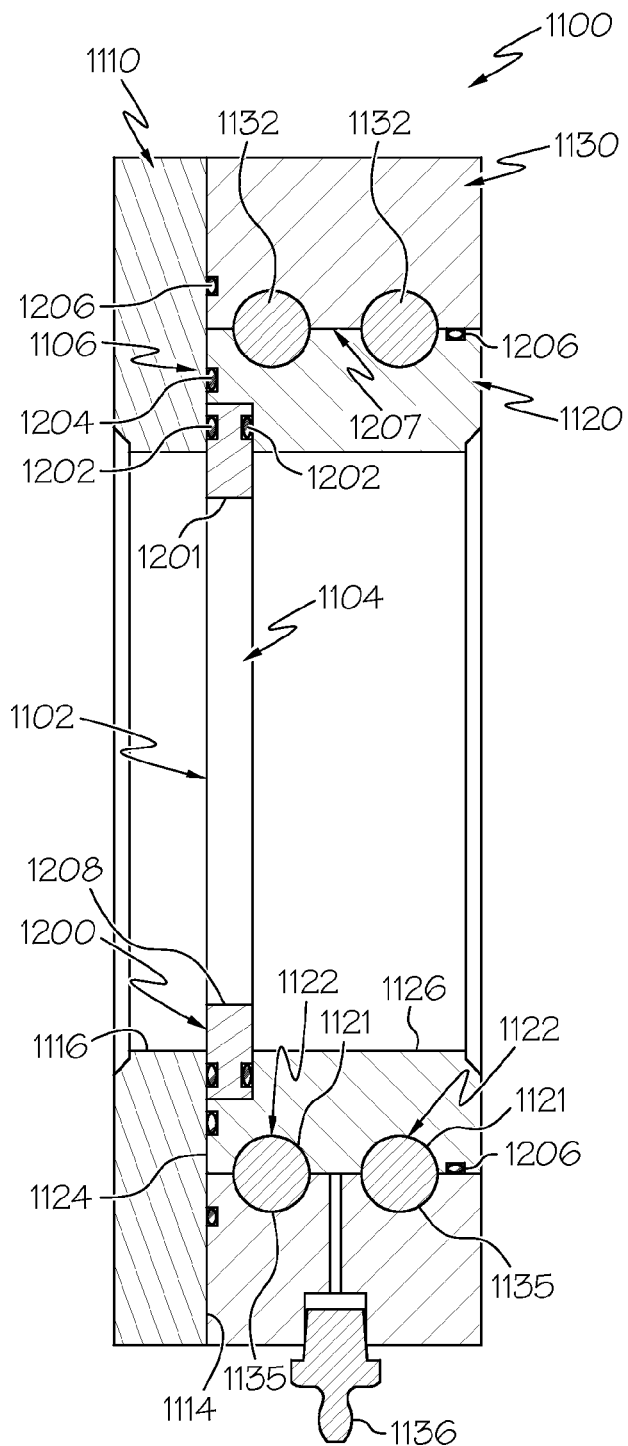
FIG. 21B depicts a schematic representation of a cross-section of a fluid handling swivel joint according to one or more embodiments shown and described herein.

Another embodiment of a fluid handling swivel joint 1100 is depicted in FIG. 21B. This embodiment is similar to the embodiment discussed in regard to FIGS. 20 and 21A, however, the interior opening 1126 of the tail portion 1120 extends away the seal assembly 1200 at approximately the same diameter as the interior opening 1116 of the flanged portion 1110. The interior opening 1126 allows the tail portion 1120 to be coupled to fluid handling pipes having a variety of shapes (i.e., fluid handling elbows depicted in FIG. 24B).

Figure 23:
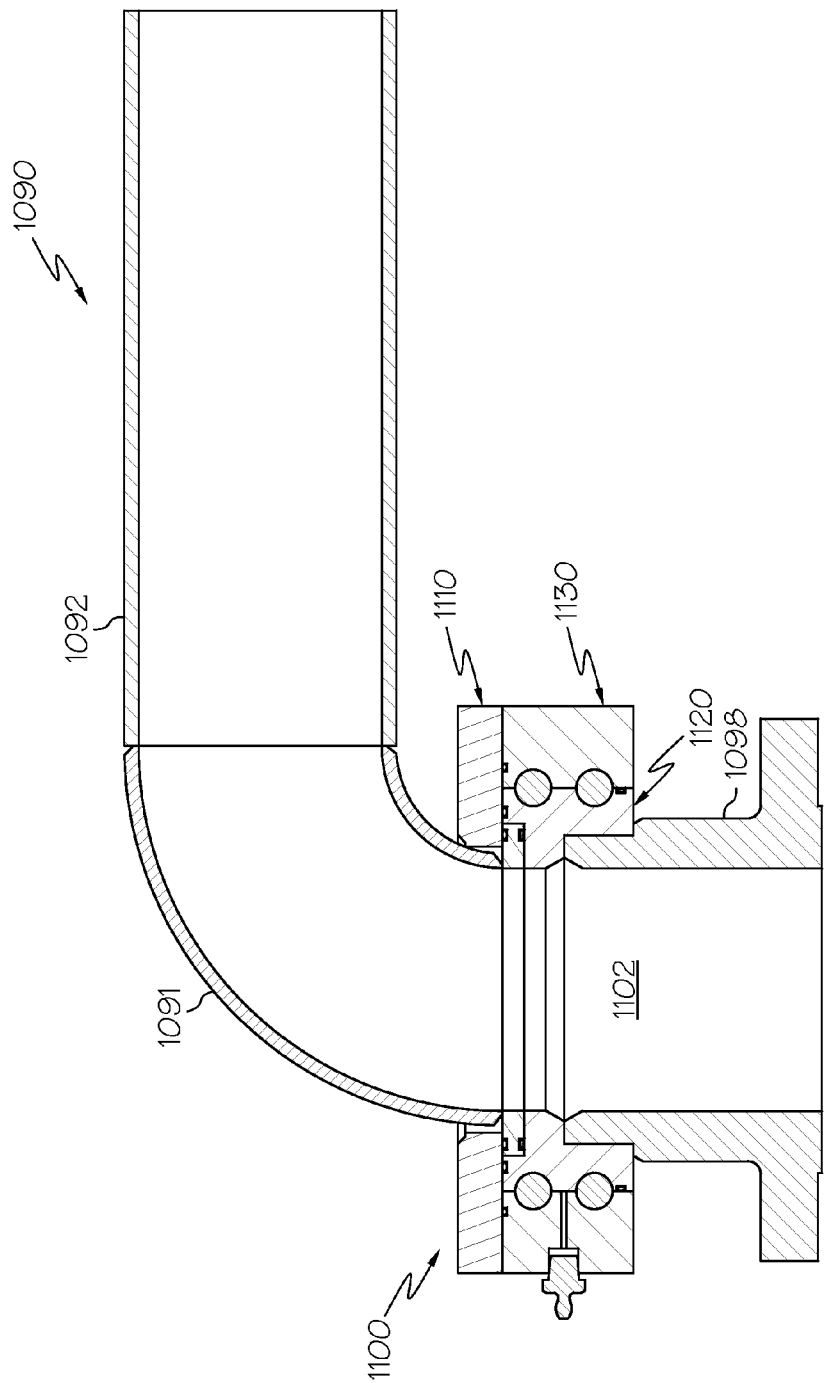
FIG. 23 depicts a schematic representation of a cross-section of fluid conveyance equipment according to one or more embodiments shown and described herein.

As depicted in FIG. 23, the fluid handling lines, here the first fluid handling elbow 1091 and the standpipe 1098, are inserted into the interior opening 1116 of the flanged portion 1110 and the interior opening 1126 the tail portion 1120, and the fluid handling lines are welded in place. As discussed above, the internal diameters of the fluid handling lines, the interior-facing diameter 1208 of the seal block 1201, and the interior-facing diameter 1128 of the tail portion 1120 form a conduit 1102 through which fluid products pass. As depicted in FIG. 23, the internal diameters of the fluid handling lines are approximately concentric with the interior-facing diameter 1208 of the seal block 1201. By constructing these surfaces to be approximately concentric, fluid product may pass from one fluid handling line to a second fluid handling line, through the fluid handling swivel joint 1100, with a minimum of restriction. Decreasing restriction through the fluid conveyance equipment 1090 may allow more fluid product to be passed through the fluid conveyance equipment 1090.

Figure 22:
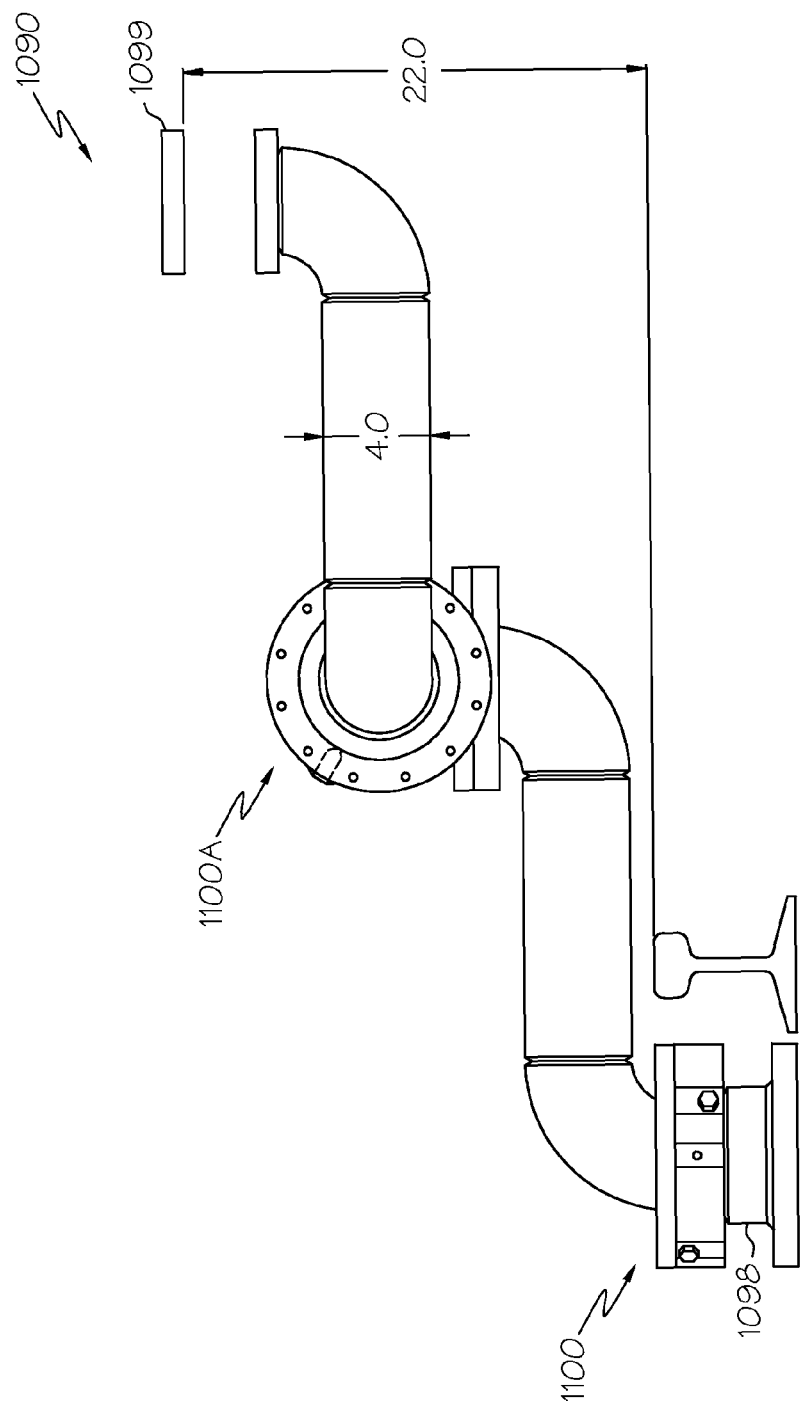
FIG. 22 depicts a schematic representation of fluid conveyance equipment according to one or more embodiments shown and described herein.

Because the flanged portion 1110 and the tail portion 1120 mate with the exterior diameters of the fluid handling lines, the fluid conveyance equipment 1090 is able to maintain smooth flow of fluid products with a minimum of spacing, here vertical spacing, between fluid handling lines. Because the fluid handling swivel joints 1100 maintain a low-profile as compared with previous fluid handling swivel joints, fluid conveyance equipment 1090 using rigid fluid handling lines may be used in applications having compact spacing between fluid entrance and fluid exit. An example of such an application, unloading fluid product from a rail car, is schematically depicted in FIG. 22. The outlet connection 1099 of the rail car is positioned approximately 22 inches above the top of the track rail. The embodiments of fluid handling swivel joints 1100 described hereinabove may be used in conjunction with 4 inch diameter pipe to create a fluid-tight connection between the standpipe 1098 and the outlet connection 1099 of the railcar. Additionally, because the fluid handling swivel joints 1100 described hereinabove lead to minimal vertical spacing between the fluid handling lines, the fluid handling lines may have a downward slope from the outlet connection 1099 to the standpipe 1098. This downward slope allows fluid product to drain from the railcar to the standpipe 1098 without using a pump.

As depicted in FIG. 24A, the fluid handling lines, here the third fluid handling elbow 1094 and the second fluid handling elbow 1093, are inserted into the interior opening 1116 of the flanged portion 1110 and the interior opening 1126 tail portion 1120, and the fluid handling lines are welded in place. As discussed above, the internal diameters of the fluid handling lines and the interior-facing diameter 1208 of the seal block 1201 form a conduit 1102 through which fluid products pass. As depicted in FIG. 24A, the internal diameter of the fluid handling lines are approximately concentric with the interior-facing diameter 1208 of the seal block 1201. Maintaining the concentricity of the fluid handling lines to the interior openings 1116, 1126 of the flanged portion 1110 and the tail portion 1120 during assembly will maintain the concentricity of the fluid handling lines with one another. Because of this, fluid handling lines can be assembled with flanged portion 1110 or the tail portion 1120 prior to the assembly of the fluid handling swivel joint 1100, which may ease installation in certain applications. By assembling components such that these features are concentric, fluid products pass from one fluid handling line to a second fluid handling line (i.e., the second fluid handling elbow 1093 to the third fluid handling elbow 1094), through the fluid handling swivel joint 1100, with a minimum of restriction. Decreasing restriction through the fluid conveyance equipment 1090 may allow more fluid product to be passed through the fluid conveyance equipment 1090.

Because the flanged portion 1110 and the tail portion 1120 have small axial thicknesses, and because the fluid handling lines are partially inserted into the flanged portion 1110 or the tail portion 1120, the distance between sequential fluid handling lines is small. As depicted in FIG. 24A, the distance 1108 from the third fluid handling elbow 1094 to the second fluid handling elbow 1093 is less than the total thickness 1109 of the fluid handling swivel joint 1100 (i.e., the combined thickness of the flanged portion 1110 and the tail portion 1120). By reducing the distance between sequential fluid handling lines, the overall clearance required to install fluid conveyance equipment 1090 is reduced for fluid handling swivel joints 1100 according to the present disclosure as compared to traditional fluid handling swivel joints. The distance between fluid handling lines may be evaluated compared to the axial distance between the offset faces of the flanged portion 1110 and the tail portion 1120 that form the annular seat. For fluid handling lines that contact opposite sides of the seal body, the distance between the fluid lines is about 100% of the axial distance between the faces of the annular seat. Embodiments described hereinabove may include fluid handling lines that are less than about 200% of the axial distance between the faces of the annular seat. Embodiments of the fluid handling swivel joints 1100 described and depicted herein allow for reduced clearance between fluid handling lines while maintaining low restriction to fluid flow and low resistance to rotation and, therefore, fluid conveyance equipment 90 articulation.

The fluid handling swivel joints 1100 may be produced in a variety of sizes to accommodate fluid conveyance equipment 1090 of various size. For example, the fluid handling swivel may be manufactured such that the diameter of the conduit 1102 through which the fluid products travel is about the same diameter as commercially available pipe sizes. Therefore, the fluid handling swivel joints 100 can be coupled to commercially available pipe of various diameter and wall thickness, and maintain a consistent internal diameter through which fluid products flow.

Additionally, by mating the exterior of the fluid handling lines with the interior openings 1116, 1126 of the flanged portion 1110 and the tail portion 1120, as depicted in FIG. 24A, a reduced number of components may be needed to accommodate a variety of commercially available sizes of pipe. As discussed above, pipe is commercially available in a series of thicknesses for a nominal outside diameter. For a given outside diameter, the actual inside diameter changes with the change in the wall thickness, keeping the outside diameter constant. Therefore, a fluid handling swivel joint 1100 may have a single diameter on the interior openings 1116, 1126 of the flanged portion 1110 and the tail portion 1120, which mate to the outside diameter of the fluid handling lines, regardless of pipe schedule. Accordingly, a variety of flanged portions 1110 and tail portions 1120 may be produced having interior openings 1116, 1126 that correspond to the nominal pipe outer diameters.

The above-discussed embodiments of fluid handling swivel joints may be produced in a variety of sizes to accommodate fluid conveyance equipment of various size. For example, the fluid handling swivel may be manufactured such that the diameter of the conduit through which the fluid products travel is about the same diameter as commercially available pipe sizes. Therefore, the fluid handling swivel joints can be coupled to commercially available pipe of various diameter and wall thickness, or schedule, and maintain a consistent internal diameter through which fluid products flow.

Components discussed in regard to certain embodiments of the fluid handling swivel joints discussed hereinabove may be interchanged into other embodiments, as necessary.

It should now be understood that fluid handling swivel joints include a spring energized seals, principal O-rings, or seal block assemblies. Additionally, the fluid handling swivel joints include a leak detection port that is in fluid communication with the spring energized seals or the primary O-rings. If the sealing ability of the spring energized seals, the principal O-rings, or the seal block assemblies are compromised, fluid product will collect in the leak detection port for sensing before being released into the environment.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these aspects of the invention.

What is claimed is:

1. A fluid handling swivel joint comprising:
   a first flanged portion comprising an opening;
   a tail portion comprising an opening and a partial channel around an exterior diameter of the tail portion, wherein at least a portion of the tail portion is adjacent to the first flanged portion, the opening of the first flanged portion and the opening of the tail portion forming a conduit;
   a body secured to the first flanged portion and at least partially surrounding the tail portion, wherein the body comprises a partial channel around an interior diameter of the body, and the partial channel of the tail portion and the partial channel of the body form a raceway;
   a plurality of roller elements positioned within the raceway;
   a primary seal positioned between the first flanged portion and the tail portion, the primary seal comprising a spring energized seal comprising a jacket that surrounds a spring, the spring being opened in a radially inwards direction such that the spring biases the jacket into contact with the first flanged portion and the tail portion;
   a secondary seal positioned between the first flanged portion and the tail portion and radially outward from the primary seal;
   a leak detection port having a leak detection tap positioned between the primary seal and the secondary seal and in fluid communication with the primary seal; and
   a first environmental seal and a second environmental seal positioned to contact at least two of the first flanged portion, the tail portion, and the body to form an isolated volume around the plurality of roller elements.

2. The fluid handling swivel joint of claim 1, wherein the tail portion further comprises a step extending towards and engaging the body in a circumferential orientation.

3. The fluid handling swivel joint of claim 1, wherein the tail portion further comprises a second partial channel around the exterior diameter of the tail portion, the body further comprises a second partial channel around the interior diameter of the body, and the second partial channel of the tail portion and the second partial channel of the body form a second raceway into which a plurality of roller elements are positioned.

4. The fluid handling swivel joint of claim 1, wherein the first and second environmental seals are positioned between the tail portion and the body.

5. The fluid handling swivel joint of claim 1, wherein the first environmental seal is positioned between the tail portion and the body and the second environmental seal is positioned between the first flanged portion and the body.

6. The fluid handling swivel joint of claim 1 further comprising a second flanged portion coupled to the tail portion.

7. The fluid handling swivel joint of claim 6 further comprising a primary static seal positioned between the second flanged portion and the tail portion and a secondary static seal positioned between the second flanged portion and the tail portion and radially outward of the primary static seal.

8. The fluid handling swivel joint of claim 7 further comprising a leak detection port that is in fluid communication with the primary static seal and the secondary static seal.

9. The fluid handling swivel joint of claim 1, wherein the primary seal extends radially inwards from the opening of the tail portion.

10. A fluid handling swivel joint, comprising:
    a first flanged portion comprising an opening;
    a tail portion comprising an opening and a partial channel around an exterior diameter of the tail portion, wherein at least a portion of the tail portion is adjacent to the first flanged portion, the tail portion further comprises a second interior-facing diameter that is smaller than an concentric with the opening of the tail portion;
    a body secured to the first flanged portion and at least partially surrounding the tail portion, wherein the body comprises a partial channel around an interior diameter of the body, and the partial channel of the tail portion and the partial channel of the body form a raceway;
    a plurality of roller elements positioned within the raceway;
    a primary seal positioned between the first flanged portion and the tail portion, the primary seal comprising a spring energized seal having a jacket that surrounds a spring, the spring being opened in a radially inwards direction such that the spring biases the jacket into contact with the first flanged portion and the tail portion;
    a secondary seal positioned between the first flanged portion and the tail portion and radially outward of the primary seal; and
    a first environmental seal and a second environmental seal positioned to contact at least two of the first flanged portion, the tail portion, and the body to form an isolated volume around the plurality of roller elements.

11. The fluid handling swivel joint of claim 10, wherein the tail portion further comprises a step extending towards and engaging the body in a circumferential orientation.

12. The fluid handling swivel joint of claim 10, wherein the tail portion further comprises a second partial channel around the exterior diameter of the tail portion, the body further comprises a second partial channel around the interior diameter of the body, and the second partial channel of the tail portion and the second partial channel of the body form a second raceway in which a plurality of roller elements are positioned.

13. A fluid conveyance equipment comprising:
a fluid handling swivel joint comprising:
- a first flanged portion comprising an opening;
- a tail portion comprising an opening and a partial channel around an exterior diameter of the tail portion, wherein at least a portion of the tail portion is adjacent to the first flanged portion, the opening of the first flanged portion and the opening of the tail portion forming a conduit;
- a body secured to the first flanged portion and at least partially surrounding the tail portion, wherein the body comprises a partial channel around an interior diameter of the body, and the partial channel of the tail portion and the partial channel of the body form a raceway;
- a plurality of roller elements positioned within the raceway;
- a primary seal positioned between the first flanged portion and the tail portion and extending radially inwards from the opening of the tail portion;
- a secondary seal positioned between the first flanged portion and the tail portion and radially outward of the primary seal; and
- a first environmental seal and a second environmental seal positioned to contact two of the first flanged portion, the tail portion, and the body to form an isolated volume around the plurality of roller elements;
a first fluid handling pipe coupled to the first flanged portion; and
a second fluid handling pipe coupled to the tail portion, wherein an exterior surface of the first fluid handling pipe is positioned within the opening of the flanged portion and the second fluid handling pipe is positioned within the opening of the tail portion.

14. The fluid conveyance equipment of claim 13, wherein the tail portion further comprises a second interior-facing diameter that is smaller than and concentric with the opening of the tail portion.

15. The fluid conveyance equipment of claim 13, wherein a distance from the first fluid handling pipe to the second fluid handling pipe is less than a thickness of the fluid handling swivel joint.

16. The fluid conveyance equipment of claim 13, wherein the tail portion of the fluid handling swivel joint further comprises a second partial channel around the exterior diameter of the tail portion, and the body of the fluid handling swivel joint further comprises a second partial channel around the interior diameter of the body, the second partial channel of the tail portion and the second partial channel of the body forming a second raceway.

* * * * *